(12) United States Patent
Castle

(10) Patent No.: US 6,254,981 B1
(45) Date of Patent: *Jul. 3, 2001

(54) FUSED GLASSY PARTICULATES OBTAINED BY FLAME FUSION

(75) Inventor: Richard B. Castle, Keizer, OR (US)

(73) Assignee: Minnesota Mining & Manufacturing Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/408,274

(22) Filed: Sep. 29, 1999

Related U.S. Application Data

(63) Continuation of application No. 08/552,138, filed on Nov. 2, 1995, now abandoned.

(51) Int. Cl.$^7$ .............................. B32B 5/16; C08K 7/16; C08K 3/40
(52) U.S. Cl. .......................... 428/325; 428/402; 428/403; 428/406; 428/407; 523/223; 524/650; 524/785; 524/788; 524/789; 524/791; 524/847
(58) Field of Search ....................................... 428/403, 407, 428/325, 402, 406; 523/223; 524/650, 785, 788, 789, 791, 847

(56) References Cited

U.S. PATENT DOCUMENTS

| 1,175,224 | 3/1916 | Bleecker . |
|---|---|---|
| 1,298,540 | 3/1919 | Miller . |
| 1,995,803 | 3/1935 | Gilbert . |
| 2,038,251 | 4/1936 | Vogt . |
| 2,044,680 | 6/1936 | Gilbert . |
| 2,676,892 | 4/1954 | McLaughlin . |
| 2,883,347 | 4/1959 | Fisher et al. . |
| 2,978,339 | 4/1961 | Veatch et al. . |
| 2,978,340 | 4/1961 | Veatch et al. . |
| 2,987,408 | 6/1961 | Minnick . |
| 3,015,852 | 1/1962 | Hoffman et al. . |
| 3,030,215 | 4/1962 | Veatch et al. . |
| 3,046,607 | 7/1962 | Blaha . |
| 3,069,292 | 12/1962 | Alexander et al. . |
| 3,133,821 | 5/1964 | Alford et al. . |
| 3,151,965 | 10/1964 | Patterson . |
| 3,190,737 | 6/1965 | Schmidt . |
| 3,272,615 | 9/1966 | Hoffman et al. . |
| 3,290,165 | 12/1966 | Iannicelli . |
| 3,365,315 | 1/1968 | Beck et al. . |
| 3,420,645 | 1/1969 | Hair . |
| 3,493,403 | 2/1970 | Tung et al. . |
| 3,560,186 | 2/1971 | Nylander . |
| 3,567,506 | 3/1971 | Iannicelli . |
| 3,653,865 | 4/1972 | Megles . |
| 3,661,673 | 5/1972 | Merriam . |
| 3,679,446 | 7/1972 | Kubo . |
| 3,773,707 | 11/1973 | Hermann . |
| 3,834,924 | 9/1974 | Grillo . |
| 3,836,504 | 9/1974 | Morisawa . |
| 3,838,998 | 10/1974 | Matthews et al. . |
| 3,839,253 | 10/1974 | Kershaw et al. . |
| 3,920,578 | 11/1975 | Yates . |
| 3,961,978 | 6/1976 | Brodmann . |
| 3,980,611 | 9/1976 | Anderson et al. . |
| 4,042,732 | 8/1977 | Ferrar . |
| 4,115,256 | 9/1978 | de Zeeuw . |
| 4,147,687 | 4/1979 | O'Donnell . |
| 4,201,560 | 5/1980 | Dewitte et al. . |
| 4,221,697 | 9/1980 | Osborn et al. . |
| 4,229,329 | 10/1980 | Bennett . |

(List continued on next page.)

FOREIGN PATENT DOCUMENTS

| 875238 | 10/1979 | (BE) . |
|---|---|---|
| 1 928 337 | 1/1970 | (DE) . |
| 1 908 471 | 10/1970 | (DE) . |
| 2912310A | 10/1979 | (DE) . |
| 2 953 526 | 8/1984 | (DE) . |
| 2421149 | 11/1979 | (FR) . |
| 2529879 | 1/1984 | (FR) . |
| 1 514 010 | 6/1978 | (GB) . |
| 2 017 677B | 10/1979 | (GB) . |
| 2 133 787A | 8/1984 | (GB) . |
| 2177083A | 1/1987 | (GB) . |
| 2 178 024B | 2/1987 | (GB) . |
| 2248834A | 4/1992 | (GB) . |
| 1207935 | 1/1989 | (IT) . |
| 49036929 | 10/1974 | (JP) . |
| 56-108522A | 8/1981 | (JP) . |

(List continued on next page.)

OTHER PUBLICATIONS

American Geological Institute, *Glossary of Geology*, 4th printing, pp. 16, 447, 543 and 796, Falls Church, VA, 1977.

(List continued on next page.)

*Primary Examiner*—H. Thi Le
(74) *Attorney, Agent, or Firm*—Hall, Priddy, Myers & Vande Sande

(57) ABSTRACT

The disclosure describes methods for producing bulk, particulate material that includes solid, generally ellipsoidal particles. Irregularly shaped feed particles with average particle sizes of up to 25 microns on a volume basis are dispersed in at least a portion of a combustible gas mixture by application of force and/or fluidizing agents. The combustible mixture with particles in suspension is then delivered, while controlling agglomeration or re-agglomeration of the particles, to at least one flame front. There, the mixture and suspended particles are uniformly distributed across the surface(s) of and passed through the flame front(s) with a high concentration of particles in the mixture. This flame front and the resultant flame(s) with suspended particles are located in at least one "wall free" zone. In such zone(s) the flame(s) may expand while the particles are maintained in dispersion and heated, with controlled and highly efficient application of heating energy. At least partial fusion occurs within at least the surfaces of the particles at high thermal efficiencies, while agglomeration of particles during fusion is inhibited.

85 Claims, 2 Drawing Sheets

U.S. PATENT DOCUMENTS

| | | |
|---|---|---|
| 4,238,430 | 12/1980 | Phillips . |
| 4,267,089 | 5/1981 | Brown . |
| 4,268,320 | 5/1981 | Klingaman et al. . |
| 4,294,750 | 10/1981 | Klingaman et al. . |
| 4,298,386 | 11/1981 | Kubo et al. . |
| 4,337,186 | 6/1982 | Crisp et al. . |
| 4,446,207 | 5/1984 | Dewitte et al. . |
| 4,448,599 | 5/1984 | Mackenzie et al. . |
| 4,475,936 | 10/1984 | Aston et al. . |
| 4,477,492 | 10/1984 | Bergna et al. . |
| 4,487,620 | 12/1984 | Neusy . |
| 4,661,137 | 4/1987 | Garnier et al. . |
| 4,668,645 | 5/1987 | Khaund . |
| 4,693,739 | 9/1987 | Manabe et al. . |
| 4,715,878 | 12/1987 | Kopatz et al. . |
| 4,725,390 | 2/1988 | Laird et al. . |
| 4,751,202 | 6/1988 | Toussaint et al. . |
| 4,751,203 | 6/1988 | Toussaint et al. . |
| 4,756,746 | 7/1988 | Kemp, Jr. et al. . |
| 4,764,218 | 8/1988 | Kobayashi et al. . |
| 4,767,726 | 8/1988 | Marshall . |
| 4,778,502 | 10/1988 | Garnier et al. . |
| 4,778,515 | 10/1988 | Kemp, Jr. et al. . |
| 4,904,293 | 2/1990 | Garnier . |
| 4,923,520 | 5/1990 | Anzai et al. . |
| 4,957,554 | 9/1990 | Mathers et al. . |
| 4,961,770 | 10/1990 | Johnson et al. . |
| 4,983,550 | 1/1991 | Goetz et al. . |
| 4,994,506 | 2/1991 | Anton et al. . |
| 5,002,696 | 3/1991 | White . |
| 5,017,523 | 5/1991 | Kimura et al. . |
| 5,063,179 | 11/1991 | Menashi et al. . |
| 5,069,702 | 12/1991 | Block et al. . |
| 5,143,534 | 9/1992 | Kilner et al. . |
| 5,217,928 | 6/1993 | Goetz et al. . |
| 5,256,180 | 10/1993 | Garnier et al. . |
| 5,326,806 | 7/1994 | Yokoshima et al. . |
| 5,340,781 | 8/1994 | Oda et al. . |
| 5,500,287 | 3/1996 | Henderson . |
| 5,534,348 | 7/1996 | Miller et al. . |
| 5,559,170 | 9/1996 | Castle . |
| 5,593,467 | 1/1997 | Monroe . |

FOREIGN PATENT DOCUMENTS

| | | |
|---|---|---|
| 58-206663 | 12/1983 | (JP) . |
| 59-189140 | 10/1984 | (JP) . |
| 62-050839 | 3/1987 | (JP) . |
| 2-59416 | 8/1988 | (JP) . |
| 63-0303842 | 12/1988 | (JP) . |
| 1036631 | 2/1989 | (JP) . |
| 1294751 | 11/1989 | (JP) . |
| 2118423 | 5/1990 | (JP) . |
| 2-199013 | 8/1990 | (JP) . |
| 4-126536 | 4/1992 | (JP) . |
| 4-126537 | 4/1992 | (JP) . |
| 4-126538 | 4/1992 | (JP) . |
| 4-147923 | 5/1992 | (JP) . |
| 5170986 | 7/1993 | (JP) . |
| 08091874A | 4/1996 | (JP) . |
| 353399 | 9/1972 | (SU) . |
| 1654272 | 6/1991 | (SU) . |
| 1654273 | 6/1991 | (SU) . |
| WO 95 29134A | 11/1995 | (WO) . |

OTHER PUBLICATIONS

American Petroleum Institute, *Recommended Practices for Testing High Strength Proppants Used in Hydrualic Fracturing Operations*, p. 12, Washington, D.C. 1989.

Beck, W.R., Minnesota Mining & Manufacturing Co., Record of Invention No. 5, "Glass Beads from crystals," dated Jun. 14, 1957, Dec. 18, 1957 and Dec. 23, 1957, and notarized Dec. 23, 1957.

Bennett, H., F.A.I.C., *Concise Chemical and Technical Dictionary*, 3rd Edition, pp. 460, 1135–1136, Chemical Publishing Co., Inc., New York, N.Y. (1974).

Budov et al, *Glass and Ceramics*, vol. 50, No. 7, pp. 275–279, XP000441844, "Glass Microbeads, Applications, Properties, and Technology," New York, NY, Jul. 1993.

Chemical Abstracts, vol. 100, 1984, p. 302, 100:14402W, Expansion of Perlite, Stockman, Bernard, French Pat. 2,629, 879, Jul. 12, 1982.

6001 Chemical Abstracts, vol. 102 (1985) May, No. 20, Columbus, Ohio, USA, p. 138–139.

Deer, W.A. et al, *An Introduction to the Rock–Forming Minerals*, pp. 140–143, 282–338, 356–365, Longman Group Limited, London, 1975.

Hurlbut, C.S., *Dana's Manual of Minerology*, 18th Ed., p. 460, John Wiley and Sons, Inc., New York, N.Y., 1971.

Hutchison, C. S., *Laboratory Handbook of Petrographic Techniques*, pp. 1, 15–16, 44, 47, 73, 113, 132, 180, 235, 247, 264, 333, 354, 374, 375, 414–425, 438, John Wiley and Sons, Inc., New York, N.Y., 1974.

International Search Report, PCT/US95/04985, Aug. 2, 1995.

Kadey, F. L., Jr., *Industrial Minerals and Rocks*, 5th Edition, vol. 2, , "Perlite," pp. 997–1010, Society of Mining Engineers of the American Institue of Mining, Metallurgical, and Petroleum Engineers, Inc., New York, NY, 1983.

Katz, H.S. et al, *Handbook of Fillers and Reinforcements for Plastics*, Van Nostrand Reinhold Company, New York, N.Y. 1978, pp. 66–78, 127–135.

Katz, H.S. et al, *Handbook of Fillers and Reinforcements for Plastics*, Van Nostrand Reinhold Company, New York, N.Y. 1987, pp. 441 and 450.

Keith, M. L., *Bulletin of the Geological Society of America*, vol. 50, (12 part 1), pp. 1795–1826, Petrology of the Alkaline Intrusive at Blue Mountain (Dec. 1939).

Kirk–Othmer, *Concise Chemical and Technical Dictionary*, 3rd Ed., pp. 236–237; 1280–1282, "Ceramics" and "Zirconium and Zirconium Compounds".

Lange, N. A., *Handbook of Chemistry*, "Properties of Minerals, Penfield's Scale of Fusibility," pp. 166–167, McGraw–Hill Book Company, New York, N.Y. 1956.

Lefond, S. J., *Industrial Minerals and Rocks*, 5th Ed., vols. 1 and 2, Society of Mining Engineers, pp. 709–722, 931–960, 1383–1390, New York, N.Y. 1983.

Plueddemann, E. P, *Silane Coupling Agents*, 2nd Ed., Plenum Press, 1991.

Protasova et al, *Glass and Ceramics*, vol. 50, No. 7, pp. 342–344, XP000441852, "Use of Local Raw Material in the Glass Industry," New York, NY, Jul. 1993.

Reed, R. J. *North American Combustion Handbook*, 2nd Ed., p. 432, North American Mfg. Company, Cleveland, OH 1978.

Taggart, A.F., *Handbook of Mineral Dressing*, pp. 118–120, John W. Wiley and Sons, Inc., New York, N.Y. 1945.

Zeelan Industries, Inc., "What to expect when you include Zeeosphees® in your paints and coatings.", St. Paul, Mn., 1989.

FUSED GLASSY PARTICULATES OBTAINED BY FLAME FUSION

CROSS-REFERENCE TO RELATED APPLICATION

This application is a continuation of and was with the Applicant's prior application Ser. No. 08/552,138, filed Nov. 2, 1995, abandoned on Sep. 29, 1999, but inadvertently printed as U.S. Pat. No. 6,027,799.

TECHNICAL FIELD

The present invention relates to improved flame fusion methods for making at least partly fused, substantially glassy particulate products. Preferred embodiments of the invention include energy efficient methods for making generally ellipsoidal particulates by at least partial direct fusion of feed particles at economically feasible throughput rates while controlling unwanted formation of enlarged product particles from agglomerated feed particles.

INCORPORATION BY REFERENCE

The subject matter of the drawings, written disclosures and claims of the present inventor's U.S. patent applications Ser. Nos. 08/231,937, filed Apr. 25, 1994; now abandoned 08/456,179, filed May 31, 1995; now U.S. Pat. No. 5,559,170 and 08/526,773, filed Sep. 21, 1995; now abandoned, but inadvertently printed as U.S. Pat. No. 5,641,717 each entitled COMPOSITIONS COMPRISING FUSED PARTICULATES AND METHODS OF MAKING THEM, to the extent not in direct and irreconcilable conflict herewith, are hereby incorporated herein by reference.

BACKGROUND ART

Techniques for melting or softening small feed particles under controlled conditions to make generally ellipsoidal particulate products are known. Examples include atomization, fire polishing and direct fusion.

Atomization involves melting myriad feed particles to convert them to bulk liquid glass. A thin stream of such glass is atomized through contact with a disruptive air jet. It divides the stream into fine droplets. These are kept away from one another and from other objects until they cool and solidify. Then they are recovered as substantially discrete, generally ellipsoidal glassy, amorphous particles.

In fire-polishing, discrete, irregularly shaped glassy solid feed particles are heated to a soft or molten condition while dispersed and suspended in a hot gaseous medium. Surface tension forms the particles into ellipsoidal shapes. Kept suspended in cooler gases until reaching their freezing temperatures, the particles are recovered as solid, generally discrete glassy ellipsoids.

Atomization and fire polishing of glasses may be described as indirect methods. Their feed materials have been formulated from glass-making raw materials which were melted and homogenized in the form of bulk liquid prior to entering the ellipsoid-forming step. Consequently, in indirect methods, the individual chemical identities of the glass-making raw materials have been merged into an average composition which is uniformly present in the respective ellipsoids so produced.

Direct fusion, somewhat similar to fire-polishing, uses feed particles with irregular shapes that are not glassy, or are at least not fully glassy. They may be discrete solid particles and/or adherent groups of particles. These groups are sometimes referred to as clusters or agglomerates. Heated while in suspension and dispersion in a hot gaseous medium, the feed particles are softened or melted and formed into molten, generally ellipsoidal shapes, followed by cooling, freezing and recovery in an at least partly, but more fully, glassy state.

Unlike direct fusion, fire-polishing typically employs solid feed particles that are in a relatively highly or fully glassy or amorphous state. At some point in their history, they have existed in bulk liquid form. In direct fusion, feed particles that are not fully glassy or amorphous, and that are often non-glassy minerals, undergo direct conversion to glassy form, or at least to a more nearly glassy and amorphous form, in an ellipsoid-forming step, without prior conversion to bulk liquid form. Flame fusion, as employed herein, involves formation of at least partly fused, substantially glassy particulate products by direct fusion or fire-polishing of solid feed particles having physical states, as fed to a fusion zone, ranging from fully crystalline to fully glassy and amorphous.

In direct fusion, each ellipsoidal product particle may be formed by fusion of either a discrete feed particle or by fusion of a group of several mutually adherent feed particles, described herein as agglomerated. These product particles respectively and generally exhibit the varying chemical compositions of the discrete particles and/or the average chemical compositions of the groups of agglomerated particles, from which the ellipsoids are respectively formed, except that there may be relatively small losses of ingredients through high-temperature volatilization. Thus, direct fusion products do not necessarily have the more uniformly similar particle-to-particle composition expected of particles produced from bulk liquid glass by atomization or fire-polishing.

Various forms of equipment, as well as differing forms of feed handling and fusion methodology have been employed in known flame fusion processes. For example, as early as 1935, it was taught in U.S. Pat. No. 1,995,803 to Gilbert, at page 1, column 1, lines 31–32 and at column 2, lines 33–41, that in order to generate well-formed spherulized products, feed particles should be positively dispersed in the fuel and/or oxygen-containing gas that is fed to a burner that heats the fusion zone, and that this can be done upstream of the burner. Gilbert also teaches, at page 2, column 1, lines 1–8, that subsequent heating and expansion of these gases provides an additional dispersive effect. This patent does not disclose the geometry of Gilbert's combustion chamber. However, his later U.S. Pat. No. 2,044,680, at page 3, column 1, lines 2 and 5, twice describes his chamber as having "confining" surfaces.

As a further example, Garnier, in U.S. Pat. No. 4,778,502, at column 2, lines 41–45, discusses production of hollow microspheres from particulate feeds. At least 90 percent by weight of the feed particles have particle sizes less than 20, and preferably less than 10, microns. To combat agglomeration of the feed, which is recognized as making difficult the production of microspheres of small dimensions, the patent proposes pre-treating the feed by distributing over its particle surfaces a small amount of a "fluidizing agent," preferably alkanol amine(s). See column 2, lines 46–58. Feed, ball-milled with such agent, can be dispersed in gases, as taught at column 6, lines 19–35 and column 4, lines 50–55, and then fused with the aid of either of two burner types. Each of these, as described at column 4, line 64 through column 5, line 43 and in FIGS. 1 and 2, has a combustion chamber which is of restricted cross-section relative to a down-stream expansion enclosure. The combustion chamber, which includes fuel ports 20 and air ports 23,24, has an extension of equally restricted cross-section surfaced with refractory 25 (FIG. 1) or a liquid-cooled metal wall 27 (FIG. 2). In the FIG. 1 burner, the feed dispersion is projected into combustion gases departing the front end or outlet of the combustion chamber through one or more radially oriented injection ports 30,31. In the burner of FIG. 2, the feed dispersion is projected into the combustion chamber through an axial pipe 17 in the back end of the burner.

In British Patent No. 2,178,024, at page 5, line 33 through page 6, line 4, Mouligneau et al. say that it is most desirable to use feed well dispersed in the combustible gases. They teach propelling a stream of gas with entrained feed through a passageway leading to the combustion chamber and forcing a second stream of gas transversely into the first stream through an orifice in the passageway wall, to generate forces said to promote intimate admixture. Also, at page 2, lines 6–8, these patentees describe a tendency for feed particles to agglomerate and/or stick to the fusion chamber walls. They attributed this problem to excessive heating of the feed during fusion. As a solution, they proposed, at page 2, lines 15–20, to provide a flowing gaseous sleeve. It surrounded the stream of flaming combustible gases containing dispersed feed particles. The sleeve was said to improve yields of high quality beads by keeping the feed particles wholly enveloped in the flame, encouraging rapid heating of the feed, adding kinetic energy to the feed and product particles while keeping them dispersed and promoting rapid departure of product particles from the fusion chamber, cooling the fusion chamber walls and thus reducing agglomeration and sticking tendencies. See page 2, lines 22–31.

Morishita, et al., in Japanese published patent application HEI 2[1990]59416, published Feb. 28, 1990, discuss direct fusion of silica with particle sizes of less than 10 microns. Severe problems of agglomeration of the feed materials in the flame during fusion and adherence of particles to the furnace wall are mentioned. They suggest agglomeration may be prevented by working with plasma induction at temperatures exceeding those of the usual fusion furnace. However, they explain that this method is not suitable for mass production and has poor energy efficiency. Morishita, et al. proposed to solve these problems by using feed powder reduced by jet mill to less than 10 micron particle size, followed by direct fusion in a fusion furnace with an oxygenflammable gas (e.g., oxygen-propane) flame. Feed is supplied to a burner having a powder discharge port at the center, and an opening for the gas flame at the center axis. The thermal load of the burner and the thermal load per unit volume of the furnace were respectively in the ranges of 100,000–200,000 kcal/H and less than 2,000,000 kcal/m³H. Higher thermal loads were said to lead to agglomeration of the feed, and lower burner thermal loads were said to lead to products of poor quality.

Commenting further on their above-described work, the above inventors and one other, in Japanese published patent application HEI 2[1990]199013, published Aug. 7, 1990, acknowledge that it proved difficult for them to make fine spheroidal silica at high yield by direct reduction of fine silica with control of thermal load. However, they suggest that this problem may be overcome by supplying a cooling gas to, and adjustment of, the flame generating area. Working with a fusion furnace with an oxygen-flammable gas flame again, and with less than 10 micron feed which is dispersed in carrier gas and fed to the center of the flame, they blow in cooling gas perpendicular to the flame or introduce it through a ring. This is done at a selected position downstream of the burner and is said to effectively eliminate flame generation, i.e., quench the flame. By changing the position and other aspects of introduction of the cooling/quenching gas, it is said that one can adjust the residence time of the silica in the flame, prevent growth of the grains by agglomeration in the flame and recover high yields of small particles.

In Japanese published patent application No. HEI 4[1992]-147923, "Manufacturing Method of Spherical Microparticles," by T. Koyama, et al., published May 21, 1992, the inventors suggest, apparently in the attempt to recover very small products, grinding the raw material to a particle size in the range of 0.1 to 1 micron. However, it appears that the fusion procedure used suffers from some considerable agglomeration of the molten or soft particles.

Notwithstanding the progress made by prior workers in the art, it appears that there is a need for, and an opportunity to provide, further improvements in the yield and energy efficiency of flame fusion processes aimed at producing very fine generally ellipsoidal particles. This appears especially true in relation to mass production of products, from feeds in the particle size ranges with 50th percentiles (average particle size) of up to about 25, up to about 20, up to about 15 and up to about 10 microns, or with 90th percentiles of up to about 60, up to about 40 and up to about 30 microns, by volume. In production of these products, increasing production rates have tended to produce agglomeration and ensuing particle size growth during fusion, while agglomeration has been avoided at the expense of energy efficiency.

The present invention seeks to fulfill the above-stated need. This goal has been fulfilled, and solution in part by development of the methods disclosed below.

DISCLOSURE OF THE INVENTION IN SUMMARY FORM

The present invention includes compositions of matter comprising solid particles wherein at least a portion of said solid particles are generally ellipsoidal particles that are substantially glassy. At least a portion of said solid particles respectively constitute product particles produced by at least partial fusion of feed particles while they are flowing in suspension in hot combustion gases, said feed particles containing volatile material ranging in amount from about 1 to about 25% by weight based on the weight of the feed particles. The above-mentioned portion of solid particles also respectively are derived from, and have chemical compositions corresponding substantially with the chemical composition of, one or more silicas and/or silicates present in naturally occurring mineral deposits, except that the amount of volatile material in the product particles may differ from the volatile content of the corresponding naturally occurring mineral. The particles of such portion also have a Color Quest 457 nanometer brightness of at least about 60, have an average particle size by volume in the range of up to about 15 microns, and include at least about 1% of void volume, based on the volume of the product particles. Moreover, the composition of matter comprises about 15 to 100% by volume of said generally ellipsoidal particles that have said chemical compositions, based on the total volume of solid particles present in said composition of matter.

Other aspects of the invention are described in the description of other and preferred embodiments, which are found below.

Advantages

The invention, depending on which of its various embodiments is used, is expected to provide one or more of the advantages set forth in this and succeeding paragraphs. It should be understood therefore that the invention includes embodiments which possess less than all of the advantages described below.

It is an advantage of the invention that a wide variety of feed materials can be efficiently melted in an "open" flame, without special confining furnace walls or flame quenching processes, to provide generally ellipsoidal particles which are only a few microns in average particle size.

Particles can be used with an average diameter of less than 15 microns, such that heat transfer from the combustion gases to the particles is rapid and the particle melting or fusing point is reached in the burning zone of the open flame, without additional confinement by furnace walls.

Although it has been taught that dispersion of fine mineral particles in flames tends to extinguish them, due to lack of sufficient heat in the flames, the method of the invention can be operated without undue difficulties.

As contrasted with some prior methods which employed temperatures in excess of 2500° C. to produce small unagglomerated feeds, relatively low, energy conserving temperatures, for example up to about 2500, more preferably up to about 2300 and still more preferably up to about 2000° C., can be successfully used in the methods of the present invention. In general these methods will employ temperatures of at least about 500, more typically at least about 700 and where necessary or desired, at least about 900° C.

Particle compositions can be used with the lowest possible melting point and preferably with a "fugitive" flux, e.g., bound or dissolved volatile material such as water or sulfur oxides. It has been suggested in the prior art that combustion processes be applied to broad categories of mineral materials, including some materials containing bound or dissolved volatile materials. However, these processes generally produce large size ellipsiodal particles having a relatively large void space due to the expansion The present invention teaches the use of feed materials with bound or dissolved volatile materials and in the size range of up to about 25 microns to make generally ellipsoidal product particles which are similar in size distribution to the feed materials, on a weight basis, and a portion of these product particles have voids which total in the range of about 1 to about 20 volume percent.

Feed compositions having bound or dissolved volatile materials also aid in the fusion process. In the presence of volatile materials, compositions that would otherwise be unaffected can be fused by the relatively low flame temperatures obtained through use of stoichiometric mixtures of air and natural gas. Apparently the volatile material effectively lowers the melting point and viscosity during the fusion process, and then evaporates to leave solid ellipsoids. No reports of such low temperature energy efficient means for producing small-diameter ellipsoids from commonly available powders have been found. Similar small diameter spheres are reportedly made only by using high temperature flames generated by combusting propane gas and oxygen.

When the irregularly-shaped particles are carefully dispersed and homogeneously entrained in the combustion gases prior to ignition, and an open or unconfined flame is used without "furnace walls," rapid radiation cooling can be promoted and can be followed when needed by gradual introduction of cooling gases (air or water).

Another advantage of the present invention is that it makes possible the production of generally ellipsoidal particles in abundance while minimizing unwanted agglomeration. In at least certain of its aspects, the methods of the present invention avoid slagging, turbulence, collisions of molten particles, production of fused agglomerates and attendant yield losses.

When the above methods are applied to common and relatively low melting glasses, very high yields of small diameter ellipsoidal particles are the result. In fact yields approach 100 percent, and the size distribution of the products is equivalent to that of the starting materials, indicating almost no slagging or inter-particle collisions in the molten state.

Heretofore, commercial small diameter spheres have been produced expensively as a by-product from producing large diameter spheres. This has severely restricted commercial availability. Surprisingly, the smaller diameter ellipsoids made with the present invention are even more efficient to produce than larger ones, and they can be made from inherently higher melting compositions. This is contrary to prior art.

When common productivity enhancements such as oxygen enrichment and preheating of combustion gases are used, the small diameter products are produced at the highest microsphere production efficiencies known. One lb. or more of product can be obtained from 2000 btu of energy. When the above methods are applied to the above described and newly found sphere forming compositions, unique high-melting ellipsoidal particles are formed at high efficiency.

It is believed that in one or more of its aspects, the present invention represents the most cost effective means currently known for manufacturing very small diameter, substantially non-hollow, generally ellipsoidal particles with a high degree of whiteness and transparency.

Moreover, the apparatus and processing requirements for practicing these methods can be significantly simpler than those described previously by other workers.

Products can be produced according to the invention for a wide variety of applications. For example, such products are useful as additives in thermosetting and thermoplastic resins such as silicones and fluoropolymers, in engineering plastics, in lotions and creams, and in composites, paper and other materials in any physical form, such as for instance molded products and single or multi-layer products including especially webs and laminates. They are also useful as film antiblocking agents, as anti-caking aids, and as cosmetic powders with unusual "slip" or lubricity.

When produced in forms characterized by particular amounts of generally ellipsoidal particles, e.g., about 30 or more and up to 100% by volume based on the total volume of the solids contents of the compositions, the products may be used, even at relatively high concentrations, to form relatively low viscosity mixtures in liquids or molten plastics. Products that are abundant in generally ellipsoidal particles can have high levels of hardness coupled with low abrasiveness. Highly ellipsoidal products are also characterized by relatively low surface area and consequently engage in relatively little surface interaction with other materials with which they may be formulated in a variety of end use applications.

Products containing some particles having significant surface roughness may for example be employed to advantage in compositions where some degree of abrasiveness is desired. Fusion operations conducted according to the invention can be readily controlled to produce predetermined proportions of both substantially glassy and rough, irregular crystalline particles in the particulate product, which can thus be used to impart a predetermined degree of abrasiveness in end use applications. Such products are especially conserving of energy since much higher production rates per unit of fuel consumption can be attained where only partial conversion to ellipsoidal particles is required.

BRIEF DESCRIPTION OF THE DRAWINGS

A non-limiting embodiment of the invention, described in text which follows, is shown in accompanying illustrations, of which.

MODES FOR CARRYING OUT THE INVENTION

Figure 1:
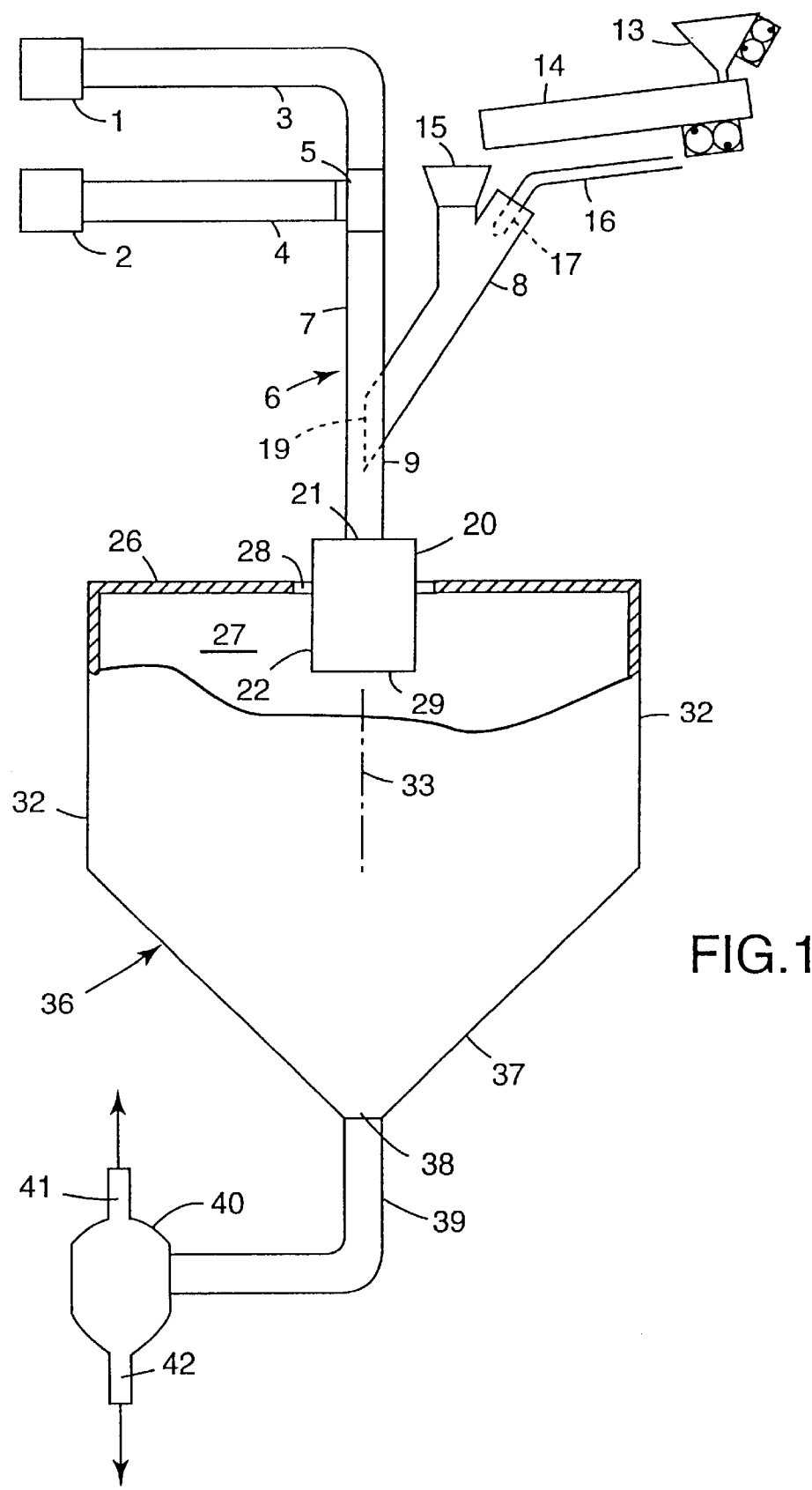
FIG. 1 is a schematic, overall diagram of apparatus for converting solid feed particles of irregular shape to a particulate product characterized by a substantial proportion of at least partly fused, substantially glassy, generally ellipsoidal and discrete particles.

In general, the solid feed particles may include any material which is fusible to generally ellipsoidal products and which will pass through the processing equipment, preferably without seriously impairing or frequently disabling that equipment, and without rendering the ultimate product unsuitable for its intended purpose. Thus, these particles may include one or more materials which are not fusible under the conditions maintained in the process. However, according to the invention, the solid feed particles include about 60 to 100% by weight of irregularly shaped particles of at least one feed material that is convertible at least in part to generally ellipsoidal particles by heating the material while it is flowing in suspension in hot gases generated by combustion of a gas mixture in which the gas particles are suspended.

In principle, there is no reason why the full range of materials that are susceptible to fire polishing and direct fusion methods may not be utilized in the method. Some examples of the naturally occurring and at least partly synthetic materials which may be used include: any of the known species of calcium silicates, including the wollastonites, these being fibrous structures attributable to their containing chains of linked $SiO_4$ tetrahedra of the composition $(SiO_3)_n$, for example wollastonite ("wollastonite per se"), pseudowollastonite and parawollastonite, and hydrated calcium silicates including xonotlite ($5CaO.5SiO_2.H_2O$), foshagite ($4CaO.3SiO_2.H_2O$), tobermorite ($4CaO.5SiO_2.5H_2O$), girolythe ($2CaO.3SiO_2.2H_2O$), Flint's hydrate ($CaO.SiO_2.H_2O$), chondrodite ($5CaO.2SiO_2.H_2O$), afwillite ($3CaO.2SiO_2.3H_2O$), okenite ($CaO.2SiO_2.2H_2O$) and hillebrandite ($2CaO.SiO_2.H_2O$); the nephelines, referring to any one or combination of the members of the nepheline group, including nepheline itself ($Na_3(Na,K) [Al_4S_4O_{16}]$) and kalsilite ($K[AlSiO_4]$), in all of their crystalline structures and solid solutions with each other; alkali feldspars, a family of feldspars that includes potassium feldspar ($KAlSi_3O_8$) alone or in combination in varying ratios with sodium feldspar ($NaAlSi_3O_8$), and which may also contain varying but usually small amounts of calcium feldspar ($CaAl_2Si_2O_8$); plagioclase feldspars, a series of materials comprising calcium feldspar ($CaAl_2Si_2O_8$) alone or in combination in any ratio with sodium feldspar ($NaAlSi_3O_8$), which may also contain varying amounts, but usually small amounts, such as about 20% by weight or less, of potassium feldspar ($KAlSi_3O_8$); volcanic ashes of all types; perlites of all types; garnets of all types; silicate glasses of all types; naturally occurring silicas of all types; silica and silicate products of all types precipitated from sodium silicate solutions; and precipitates from silica and silicate sols and gels of all types.

Feed materials having combined or dissolved volatile materials are useful for their property of lowering the respective melting temperatures of the feed materials. Silicas and silicates are widely prepared by acid precipitation from sodium silicate solutions in forms with water as a part of their composition, either chemically or physically absorbed, dissolved, or as water of hydration as well as with residual sulfate solutions or other metal ions as part of their composition.

Other examples of feed materials having combined or dissolved volatile materials include hydrated glassy rhyolites such as perlite, the hydrated silicates including calcium silicates, sodium silicates, potassium silicates, and lithium silicates; metasilicates hydrated silicas and other silicas and silicates having combined or dissolved volatile materials such as water, sulfur oxide, sulfur dioxide, sulfur trioxide, carbon dioxide, nitrogen, other sulfur containing volatiles, and other volcanic components which generally lower their respective melting temperatures and can contribute to the formation of voids.

For other examples of suitable volatile materials which are hereby incorporated by reference, see *Industrial Minerals and Rocks*, 5th Edition, Lefond, Stanley J., et al., Society of Mining Engineers of the American Institute of Mining, Metallurgical, and Petroleum Engineers, Inc., New York, 1983; *Handbook of Glass Properties*, Bansal, Narottam P. and Doremus, R. H., Harcourt Brace Javonovich, 1986; Sol-Gel Science, *The Physics and Chemistry of Sol-Gel Processing*, Brinker, C. Jeffrey and Scherer, George W., Harcourt Brace Javonovich, Boston 1990.

Materials containing volatile materials of at least about 1 or at least about 2 percent by weight and up to about 7, up to about 10, or up to about 25 percent by weight are useful as feed materials in the present invention.

"Perlite" is a hydrated silicate and encompasses both naturally occurring hydrated volcanic glass and lightweight aggregate that is produced from the expansion of glass after it has been crushed and sized. Petrologically, it is defined as a glassy rhyolite that has a pearly luster and concentric, onionskin parting. For a further discussion of the properties and mining of perlite, see "Perlite" by Frederic L. Kadey Jr. in Industrial Minerals and Rocks, Fifth Edition, v. 2, p. 997–1010, American Institute of Mining, Metallurgical, and Petroleum Engineers, Inc., New York, 1983 which is incorporated herein by reference.

In its naturally occurring form, perlite is a rhyolite glass that contains from about 2 to about 7 weight percent water, which when heated at elevated temperatures, releases such water to expand the mineral into a relatively large, low-density, hollow particle. While perlite also can occur as andesitic or dacitic glass, these forms are generally not commercially important.

Typical naturally occurring perlite compositions include 70–75% $SiO_2$, 12–14% $Al_2O_3$, 3–5% $Na_2O$, 3–5% $K_2O$, 2–7% $H_2O$ and less than 1% each of $Fe_2O_3$, $TiO_2$, CaO and MgO.

It is known in the prior art that perlite can be dried to a lower water content prior to a combustion process to provide smaller, denser and higher strength ellipsiodal particulates upon combustion. This drying process results in higher energy costs per unit of perlite particles. In the present invention, it has been found that by simply reducing the particle size of the perlite feed at or below about 25 microns, preferably about 15 microns, or more preferably about 10 microns average particle size, generally ellipsiodal particulates are formed which are stronger, much smaller, and more dense.

By the term "hydrated silicate", it is meant any one of the silicate compositions as for example described in the above cited reference for volatile materials in combination with 1 to 25% dissolved or combined water. Hydrated silicates are usually crystalline minerals represented by the following formula:

$$jM_x \cdot mSiO_2 \cdot nH_2O$$

where j is from 1 to 6, m is from j to 6 and n is from 1 to 6. For example, where j=3, for m from 3 to 6 and n from 1 to 6, such a material is considered a hydrated silicate. M represents an alkali or alkaline earth metal such as calcium, sodium, potassium or lithium and x is from 1 to 2.

A portion of the alkali and plagioclase feldspars are members of the ternary system $NaAlSi_3O_8$—$KAlSi_3O_8$—$CaAl_2Si_2O_8$. Thus, the terms alkali feldspar and plagioclase feldspar include the full range of solid solutions of these three components which can exist in ores that can be mined. Among these are feldspars containing mostly sodium feldspar in solid solution with equal or nearly equal small quantities of potassium feldspar and calcium feldspar, for example, albite and some forms of anorthoclase.

The contents of the relatively pure or concentrated forms of feed materials that are employed in the present invention need not correspond identically to their respective pure compositions or chemical formulas. Some of the factors which cause such deviation include: slight differences between the ratios of atoms in the formulas and the ratios in which those atoms actually combine with one another when forming mineral material; substitution, a process by which relatively small proportions of certain of the atoms predominantly or originally present in the crystalline lattices have been replaced with or supplanted by small amounts of other atoms not included in the formulas; the presence of one or more other minerals in solid solution with a particular mineral; the presence of a small amount of materials that are given off or lost on strong heating, also called "ignition;" addition of chemicals to the feed material in small amounts, such as to reduce the melting temperature of the feed and promote fusion or otherwise favorably influence the production process or modify the product.

Thus, when this disclosure refers to feed materials by name or nominal chemical formula, such reference is intended to include naturally occurring deviants and man-made modifications which do not render the materials unsuitable for use in the present invention. From this, it should be apparent that where the present disclosure utilizes art-recognized nomenclature of feed materials, the meaning of that nomenclature is subject to minor adjustments in meaning as are described herein. Also, chemical formulas are given herein only for convenience and not to limit the invention.

The identity and classification of feed materials can be determined with standard petrographic analytical techniques, for example those described in the *Laboratory Handbook of Petrographic Techniques*, by C. S. Hutchison, John Wiley & Sons, Inc., 1974. With such techniques one can determine the presence of designated phases by one or more of the following: X-ray diffraction patterns; determinations of chemical composition; microscopic observation; measurements of refractive index and density; calculations of the Niggli Molecular Norm (Catanorm); and differential solubility and differential staining techniques. See also *American Mineralogy*, "The Rosiwal method and the modal determination of rock," by E. S. Larsen and F. S. Miller, Vol. 20, p. 260, 1935. Many other accepted techniques and refinements are known to those skilled in the art.

The preparation of feed materials may include all or any portion of the following steps, and possibly others, depending on the nature of the starting material used. There may be drying, coarse grinding, magnetic separation, froth flotation, final grinding, surface treating and classification.

Some feed materials, even when mined from deposits in which they may be found at relatively high concentrations, will often require some degree of refining to produce feed material composed substantially of that mineral. Among the components which may be removed by such preparatory treatments are excess accessory minerals and materials which impart color to the ores. Grinding may be used not only to adjust particle size, but also to liberate unwanted accessory minerals and/or other ore components which may be present. Also, grinding may be followed by magnetic separation and/or flotation to remove the liberated accessory minerals and/or other constituents.

Feed materials are obtainable in substantially "white," "colorless" or "bright" forms convertible to substantially white, colorless or bright generally ellipsoidal particles according to the present invention. Brightness of feed and product particles in dry, packed powder form may be measured with a HunterLab Color Quest Spectrocolorimeter System, Model CQS-9400 45/0, or equivalent means, at 457 nanometers.

Feed materials used in the invention may for example have a Color Quest 457 nanometer brightness of at least about 60, more preferably at least about 70 and yet more preferably at least about 80. In general, the preferred mineral materials, used to produce white and/or transparent products with low color, contain very small amounts of $Fe_2O_3$ or $Fe_3O_4$, e.g., less than about 0.1%, and of FeO, e.g., less than about 1%. However, use of colored forms of the designated minerals and production of colored products are also contemplated.

While the feed materials utilized in the present invention do not necessarily contain minerals or other fusible substance(s)s having an exact or nominal compositional identity, they may nevertheless be "composed substantially of" at least one of these substances. Thus, the feed materials contemplated for use in the present invention may contain about 60 to 100%, more specifically about 75 to 100% and still more specifically about 90 to 100% by weight of one or more specified substances. These ranges generally embrace those materials which cause the above-described deviations of contemplated feed substances from their nominal chemical formulas. Among these are: excesses of one or more of the atoms that are included in such formulas; atomic substitutions, i.e., atoms that are not included in such formulas and that have been substituted for included atoms; solid solutions; and such other components of, additions to or modifications of the feed materials which do not render them unsuitable for use in the present invention, including without limitation man-made modifications. However, loss on ignition materials, although usually present in natural feed materials or at least in the raw materials from which they are prepared, are not to be counted either as part of the feed materials or included in the basis for applying the above weight percentage ranges.

The expression "composed substantially of" and the weight ranges just given are intended to indicate that the feed materials may correspondingly and respectively contain up to about 40%, more specifically up to about 25% and still more specifically up to about 10% by weight of "remainder" materials. Remainder materials may for example include accessory minerals, the above fluidizing agents and any other material or materials which may be present in the feed material without making it unfit for making products that contain at least about 15% of, and preferably at least about 30% of, at least partially fused generally ellipsoidal particles, such as may be useful in one or more of the end-use applications disclosed herein or in another end use.

When employing feed particles containing substances that have a specific composition that is exact or nominal, such as a mineral, it is preferred that from a major portion up to substantially all of such particles respectively contain about 60% to 100% by weight of at least one substance(s) of which the particles are composed. Thus, for example, about 50 to 100%, more preferably about 75 to 100% and still more preferably about 90 to 100% by weight of the feed particles will respectively contain about 60 to 100% by weight of such substance(s). Thus, it is contemplated that one can formulate feed materials in which there are particles that respectively contain above and below 60% by weight of those substances, including for example feed materials in which more than 50% by weight of the feed particles contain less than 60% by weight of the substance(s), but in which the weighted average composition of the feed particles reflects about 60 to 100% by weight of such substance(s). Correspondingly, one can formulate feed materials in which the particles respectively contain above and below 40% by weight of remainder material (s), but in which the weighted average composition of the feed particles reflects up to about 40% by weight of remainder material s).

According to the invention, at least partially fused particulate material is prepared from feed particles which may be prepared as above described or in any other suitable manner. The term particle is used herein in a generic sense that includes any finely subdivided form of the particular mineral involved, which may for example include grains, crystals, mixtures of crystals, mixed crystals, clusters, agglomerates and fiber fragments.

These materials are supplied to the fusion step of the process in small particle sizes. The average particle size, on a volume basis, is up to about 25, up to about 20, up to about 15 or up to about 10 microns, or the 90th percentile is up to about 60, up to about 40 or up to about 30 microns, by volume. To illustrate the meaning of volume basis, as exemplified by a preferred particle size for feed material and product of the present invention, an average or mean particle size of about 5 microns means that the aggregate volume of all particles less than 5 microns in size is equal to the aggregate volume of all particles that are more than 5 microns in size.

Some prior art processes involve grinding the feed material to the 0.1 to 1 micron range. However, this relatively difficult and expensive mode of feed material preparation may be used in practicing the present invention if desired. For some desired end uses of the products of the invention, discrete product particles essentially confined to the size range of 0.1 to 1 microns would be too small, although having some quantities of particles in this range will certainly be acceptable if not desirable in many of the end uses for the products of the present invention. Thus, in certain preferred embodiments of the invention, the feed particles have an average particle size by volume of at least about 1, at least to about 2 or at least about 3 microns.

Many if not most of the feed materials contemplated will, depending upon such factors as the chemistry and particle sizes of the ultimate particles, the ambient conditions such as temperature and humidity, the manner in which the materials have been ground, handled and stored, and the manner in which they are transported through plant equipment, will have a tendency to agglomerate and form clumps composed of multiple particles, especially when groups of the particles have been subject to compaction forces when at rest and/or in motion. The mere act of transporting particles through long conduit systems, especially those with coils, elbows and other bends, can tend to concentrate the flow of particles by centrifugal or gravitational force along the peripheries of curved sections, bringing the particles into more intimate contact and encouraging adhesion. Adhesion can also occur with the particles at rest in bulk. Adhesion may be promoted by van der Waals and other inter-atomic and -molecular forces exerted among adjacent particles.

In view of the variable clumping tendencies encountered among different feed materials under differing conditions, the particle sizes given herein are indicated particle sizes determined after agglomerated clumps of ultimate particles are broken up insofar as is feasible. Thus, for example, the particle size of the feed material may be determined after the sample has been thoroughly agitated, such as by application of vigorous ultrasonic energy, while in suspension in a liquid such as water or alcohol with use of dispersants, to separate the clumps insofar as feasible in the context of a production control process. The particle size determination is then made by any suitable technique, such as laser diffraction and/or visual analysis of electron microscope photographs so that, insofar as may be feasible, the particle size measurement is based on the sizes of the ultimate particles in the sample. Where the feed material has little if any tendency for the ultimate particles to form clumps, as above-described, an indicated particle size determination may be made without prior agitation in liquid.

Where the particles in the feed material do have a substantial or unusual tendency to clump, which will be the case for many if not most feed materials in the indicated particle size range, it will ordinarily be necessary to take special precautions in order to effectively disperse the feed particles to promote retention of particles in discrete form during the fusion operation. The invention includes dispersion of the solid particles in a carrier gas. As shown above, prior workers in the flame fusion art have called attention to the importance of adequate dispersion of feed particles. However, it is believed that what previously passed for adequate dispersion would prove woefully inadequate for practicing some aspects or embodiments of the present invention.

Two approaches to dispersion may be employed singly, in combination with one another and/or in combination with other dispersing techniques. One such technique is application of a fluidizing agent, with or without accompanying grinding. The other involves application of force to clumped and/or unclumped particles by a gas or solid member to break apart clumps, if such are present, and to distribute particles uniformly in carrier gas, which is preferably a combustible gas mixture or at least a component thereof.

For purposes of the invention, a fluidizing agent is any additive which, when spread over the surfaces of particles of feed material, reduces to a significant and useful extent whatever clumping tendencies they may have. The use of certain surfactants as fluidizing agents is known to persons skilled in the art through the teachings of U.S. Pat. No. 4,778,502 to Garnier et al. Thus, Garnier et al. described fluidizing agents as materials that have a good affinity for glass. Where the feed material employed in the present invention is not a glass, such as a crystalline mineral material, the fluidizing agent should have a good affinity for that mineral. The fluidizing agents described by Garnier et al. are composed of substances having molecules with a polar portion, comprising, for example, hydroxyl or amino radicals. Such compounds also have a non-polar portion which promotes independence of the particles treated with the fluidizing agents. Garnier et al. disclosed the use of poly alkanol amines, propylen glycol and similar compounds, which may be used in the present invention. However, in experiments with the present invention it has been found that zinc stearate and hexamethyldisilazane are more effective fluidizing agents. Triethanolamine may also be used. For additional examples, see Kopatz and Pruyne in U.S. Pat. No. 4,715,878, which describes additional anionic, cationic and nonionic treatments which can be used in the present invention. Any other effective surfactant or other fluidizing agent may be used.

Typically, the fluidizing agents employed in the present invention are those which are effective to substantially inhibit clumping when used in amounts of up to about 1%, more preferably up to about 0.5% and still more preferably up to about 0.3% by weight based on the weight of the feed material treated therewith. However, smaller feed particles, for example those less than 5 microns, will have a much larger aggregate surface than the same weight of larger particles, for example 15 micron particles. Thus, for the very finest particles and/or for those particles which tend to clump stubbornly, larger amounts of fluidizing agent may be necessary.

The fluidizing agents may be applied to the feed material particles, and preferably to the entire mass of solid feed particles in any effective manner, including the time honored technique of milling the feed material or the entire mass of solid feed in contact with the fluidizing agent. It is recommended that the fluidizing agent be added to the feed material, and preferably to the entire quantity of solid feed particles to be used, during ball mill grinding, preferably as several additions during the grinding process. Such additions can be made as part of a final size reduction step in the preparation of the particles. Intimate dispersion over the particle surfaces has for instance been achieved by ball-milling the particles for about one hour with about 0.5% by weight of surfactant, based on the total weight of particles. However, where the particles are already at their desired particle size, the fluidizing agent can be applied by merely agitating the agent and the particles together in a suitable chamber or zone.

Appropriate dispersion forces, which includes where necessary sufficient force to deagglomerate agglomerated particles, may be applied in any effective manner. An appropriate example, involving a gas jet and venturi, is described below. In general, one may employ any form of force, generated in any equipment which is effective to break apart clumps of feed material, other solid feed particles or both. Thus, for example, one may employ methods and apparatus that subject clumped particles to impact with one another, or with relatively high energy gas streams and/or with solid objects, moving or stationary.

Thus, for example, the particles may be forcibly projected against a stationary surface such as a wall or target, or may be passed through the blades of a fan, including a turbine, to provide collisions and ensuing impact between the particles and fan blades. Disc mills, jet mills and hammermills are other examples of devices that may be suitably adapted to provide sufficient impact and shear for particle dispersion, including deagglomeration. Impact includes direct frontal impacts and skipping contacts, such as those which apply shear and/or rotational forces to clumps.

In some cases, depending on the properties of the particles and the manner in which they are handled and transported downstream of the dispersing operation, use of a fluidizing agent alone or use of dispersing force alone may be sufficient to adequately disperse the feed. However, when practicing certain embodiments of the invention, the amount of dispersion effort applied in some prior dispersion operations may be inadequate. Thus, when practicing the invention with solid feed particles having stubborn clumping tendencies, or with downstream processing equipment that does not minimize exertion of compaction forces on dispersed feed particles, or with high throughput levels described below, unprecedented levels of dispersion effort may be required. Thus, it may be necessary to apply fluidizing agent at levels heretofore considered unnecessary or even undesirable and/or to apply dispersion force and energy at levels beyond those formerly considered necessary.

In order to determine whether the amount of fluidizing agent and/or force applied to the feed particles has been sufficient to deagglomerate and disperse them, the following tests may be used. The tests involve collecting a first sample of feed particles upstream of the dispersion operation and measuring by laser diffraction methods the particle size of that sample after ultrasonic agitation in water or alcohol and a dispersant. Such agitation is sufficient to allow determination of a deagglomerated size distribution for comparison. This measurement establishes what is referred to as the "primary" size distribution.

A second sample dilutely dispersed on a flat surface is collected at any suitable point in the process downstream of the dispersion operation. For example, a glass plate may be prepared, having a thin film of "tacky" substance on its surface. One may then rapidly pass the glass plate through a stream diverted from a duct receiving particles from the dispersion operation, such as a duct conveying feed particles to a burner. This sample will be measured to establish a "secondary" size distribution, for example by conventional microscopy methods, to determine the presence of agglomerates.

The difference in indicated particle size observed in the primary and secondary samples is indicative of the extent to which the dispersing treatment has been effective. Relatively small differences indicate effective dispersion treatment, while large differences indicate less effective dispersion treatment. This difference at the 90th percentile is preferably in the range of up to about 20%, and more preferably in the range of up to about 10%, on a weight or volume basis, based on the primary distribution. That is, for feed with a primary distribution of 90% less than 50 microns, the dispersed sample will have 90 percent less than 60 microns or preferably less than 55 microns.

An alternative procedure may be used. Samples of solid particles may be collected upstream of the dispersion step and measured while dispersed in water or alcohol as before. Downstream of the dispersion step a sample may be diverted and air conveyed through a laser detection device and the dispersed size distribution compared as in the previous paragraph. The laser diffraction techniques have the advantage that they may be applied on a "real-time" basis to side streams diverted from the main stream of dispersed and undispersed feed particles upstream and downstream of the dispersing operation.

As still another alternative, the effectiveness of the dispersing step can be determined by comparing the primary size distribution of the feed particles when dispersed in water or alcohol with the size distribution of the flame fused generally ellipsoidal particles, also when dispersed in water or alcohol. Suitable corrections must be made for the presence of voids when present in the product particle.

If both fluidizing agent and force are applied to disperse the particles, it may prove most convenient to apply the fluidizing agent first and then follow with application of force. However, operation in the reverse order is also possible. Nevertheless, since the ultimate goal is to disperse the feed particles in a carrier gas, starting with application of fluidizing agent is preferred, since this operation may then be immediately followed by application of force to the feed particles in the presence of the desired carrier gas.

The carrier gas may or may not be a combustion supporting gas. It may in fact be an inert gas, but in that case the amount used must be regulated carefully. It is particularly preferred that the carrier gas be a combustion supporting gas, which includes one or both of the components required for combustion, including fuel and/or oxygen containing gas.

Among the appropriate fuel gases are hydrogen, methane, ethane, propane, butane, and other gases, including vapors of heavier hydrocarbon fuels and/or carbonaceous gases such as carbon monoxide. The heavier hydrocarbon fuels include those that are liquids or semi-solids at ambient conditions (20° C. and atmospheric pressure) but that can exist substantially in vapor form at the conditions under which they are mixed with feed particles. Preferably, the hydrocarbon fuels are those that are gases at ambient conditions, including for example acetylene and particularly those hydrocarbon fuels in which the hydrogen to carbon mole ratio is about 2.5 or more. This includes for example butane, propane, ethane and methane, e.g., in the form of natural gas.

As oxygen-containing gas one may use substantially pure oxygen, oxygen enriched air or unenriched air as drawn from the atmosphere, it being an advantage of the invention that suitable oxygen-containing gases may be used that have nitrogen contents in the range of about 50 to about 80 mole percent, the balance being primarily oxygen.

The combustion supporting gases are preferably substantially free of sources of cinders, including ash and carbon particles. However, the presence of very fine, clean burning, particles of carbon and solid carbonaceous fuels is acceptable.

Preheating of the fuel, air, oxygen enriched air and feed particles generally increases productivity and decreases the time of contact between the feed particles and the combustion gases required to at least partially fuse the particles. Preheating of the feed particles can also assist in "conditioning" the materials by removing surface moisture or electrostatic charges and thereby provide improved dispersion into the combustion gases.

Either the fuel or the oxygen containing gas may be described as "at least one portion of a combustible gas mixture." It should be understood that the foregoing expression includes either of these components, the ultimate combustion gas mixture that will be burned later in the process and/or any other gas that may acceptably included in the gas mixture fed to the burner which generates heat in the combustion zone. Thus, the combustible mixture may be formed prior to or after dispersion of the feed particles, and dispersion of feed particles in a portion of the gas mixture is intended to generically include dispersion in the entire mixture to be fed to the burner or in any portion thereof, provided dispersion can be maintained if such portion is subsequently mixed with the remaining components of the ultimate combustible mixture.

In certain instances, the feed particles will be dispersed in only a portion of the combustible mixture and transported with that portion to the burner, where mixing with the remaining parts of the combustible mixture will take place. In other circumstances, the entire gaseous (including vaporous) components of the combustible mixture may be formed upstream of the dispersion location, in which event the dispersion operation will disperse the feed particles in the entire combustible mixture. A variety of intermediate options are possible in which the feed particles are first dispersed with portions of any part of the combustible mixture, followed by admixture with the remaining part or parts of the combustible mixture at or prior to the flame front in the burner. However, in carrying out the processes of the invention it is definitely preferred that the entire combustible mixture be formed, and that the entire amount of suspended feed particles be fully dispersed in that mixture, upstream of, and less preferably as it enters, the flame front.

The flame front is an imaginary "surface" or "surfaces" in which the mixture is ignited. The shape and number of the surface(s) will be dependent upon the shape and design of the burner that is utilized.

The possibility of performing all or at least the last stages of dispersion and the burning of the mixture in a burner, i.e., in one and the same apparatus, is contemplated. However, in most applications, it is anticipated that the dispersion apparatus and the flame front in the burner will be separated from one another by some distance, and that the suspended feed particles must therefore be transported between these two locations. Where it is necessary to transport dispersed feed particles from a dispersion location to the flame front, considerable care must be exercised.

Feed particles that have been well-dispersed in the dispersion operation can be re-agglomerated during transport. Transport through long ducts, or ducts with sufficient aggregate curvature in the form of elbows, coils and the like, can produce concentration of particles in a portion of the cross-section of the conduit system, for example, through centrifugal or gravitational forces. These forces and the ensuing concentration of particles represent compaction forces which can agglomerate or re-agglomerate dispersed particles. Thus, the best practice will be to restrict the overall distance between the dispersion location and the flame front and to maintain flow velocities of at least about 5, and preferably at least about 20, meters per second.

Where the suspension must traverse ducts or conduits from a dispersion location to the flame front, the conduit system should be designed to minimize compaction forces. This goal is normally best attained by arrangements which minimize exertion of centrifugal and/or gravitational forces of the kind that would tend to concentrate the flow of particles in a portion of the crosssection of the conduits. Thus, for best results it is believed that one should tend to avoid conduit arrangements with short radius curves or sharp corners and to avoid long horizontal runs of piping.

Rather, relatively straight runs of vertical piping are preferred, and if bends are necessary, it is preferred to employ long smooth curves, especially those with radii equaling 5 or more and preferably 10 or more times the cross-sectional or diametral dimension of the conduit or duct. A particularly preferred arrangement is illustrated in the drawings and following text of this application. In that arrangement, the suspension is fed to a burner from above, through quite short transport tubes, there being acute angles between any merging tubes, and the transport tubes and burner are oriented vertically, or at least substantially vertically (within about 20° of vertical). The burner has a generally axial flow pattern with an at least substantially vertically oriented throat and substantially horizontal outlet. Thus, the suspension can pass essentially straight through the burner without any major change of direction and preferably with minimal or no change in direction except for such directional changes as may be attendant to lateral spreading of the gas stream as it moves from the vertical supply pipe to the burner outlet with components of motion that are primarily axial and radial.

A specific embodiment of an appropriate burner is described below and in the accompanying drawings. However, a variety of burners can be used to ignite the combustible gas mixture containing entrained feed particles. Examples may be found in *North American Combustion Handbook*, edited by Richard J. Reed, 2d Ed., North American Manufacturing Company, Cleveland, Ohio, U.S.A., 1978, the contents of which are hereby incorporated herein by reference. See also Soviet Union Patent Nos. 1,654,272 and 1,654,273 to Nosach, et al., both assigned to As UKR Thermo-Phys. Stekloplastik Prodn. Assoc. Persons skilled in the art, with the benefit of the present disclosure, will select or adapt such burners as necessary to facilitate their acceptance and transmission of combustible gas mixtures containing entrained feed particles, adjusting the sizes of passages and orifices as required to keep such particles in a dispersed condition and avoid clogging of the burner.

Still other forms of burners may be employed. However, the preferred burners are those which do not subject particles to compaction forces and tend to re-agglomerate them. Moreover, the preferred burners are consistent with the suspension of feed particles in the combustible mixture being formed upstream of the flame front and with delivery of the particles to the flame front with the dispersion distributed uniformly across and passing through the flame front in a very uniform manner, rather than being projected into a zone downstream of the flame front or into the side or the center of the flame, as has been done in a number of prior art processes.

Observance of these precautions is particularly important in practicing some aspects of the invention which involve unusually high concentrations of feed particles in the combustible mixture fed to the flame front. More particularly, the concentration of feed particles in the combustible gas mixture may for example be at least about 0.05 (0.05) or preferably at least about 0.1 (0.1) and still more preferably at least about 0.2 (0.2) lbs. (kilograms) per lb. (per kilogram) of gases in the mixture. Concentrations of up to about 1 or up to about 1.5 or up to about 2 (2) lbs. (kilograms) per lb. (per kilogram) of gases in the mixture are contemplated.

Given the small particle size of the feed particles employed in the invention, such concentrations were high enough to create an expectation that the aggregate surface area of such small particles employed in such large concentrations would quench the flame emanating from the burner. Such concerns were particularly great in relation to operating at a restricted level of heat utilization, in accordance with one aspect of the invention described below. Contrary to expectations, it is possible to operate successfully at these high concentrations, without quenching of flame and without unwanted agglomeration of the particles with each other and with the chamber walls, as the particles soften or partially melt and reshape themselves in a chamber downstream of the burner.

In accordance with at least one aspect of the invention, the flame front and at least a substantial portion of the resultant flame are maintained in a wall free zone which extends downstream of the front, while maintaining the suspended feed particles in a dispersed condition in said zone. The nature and significance of a wall free zone and a schematic specific example thereof are described in the following text and the accompanying drawings. The wall free zone shape and dimensions are such as to substantially inhibit molten particle contact with surfaces of the burner, zone and conveying devices, preferably limiting such contact to negligible amounts.

Several features of the present method are performed in the wall free zone. The dispersed feed particles are heated with heat transferred thereto by burning of the combustible mixture. There is at least partial fusion of the irregularly shaped particles within at least their surfaces. The burning gases are caused to expand and the feed particles are caused to fuse to produce at least partially fused bulk particulate product containing generally ellipsoidal discrete product particles.

Preferably, there is sufficient expansion so that there will be at least about 15%, or preferably at least about 30% by volume of discrete, generally elliptical particles produced. Preferred embodiments produce up to about 90% and more preferably up to about 99% of discrete, generally elliptical particles. Expansion of the combusting gas stream tends to keep the particles separated from one another while they are in a softened or semi-molten or fully molten condition, reducing opportunities for particle collision and agglomeration. Agglomeration reduces the population of discrete particles and causes the resultant agglomerated particles to have a larger particle size than the feed particles.

Sufficient amounts of expansion and a sufficient ratio of feed particles to heat released can be established and monitored using the following test. The excess, if any, of indicated particle size of the product particles, relative to the indicated particle size of the feed particles, is determined. This determination is based, in the case of the feed particles, on the condition of those particles prior to application of the fluidizing agent and/or dispersing force. Each of the particle size indications is based on a sample subjected to agitation, as above-described, in water, alcohol or other suitable liquid.

The indications of particle size may be obtained in any appropriate manner, such as by laser diffraction techniques or by analyzing photographs of scanning electron microscope images of the samples. Preferably, the excess, if any, of the indicated 90th percentile particle size of a sample of the product, minus the 90th percentile primary particle size of a sample of the feed from which the product has been prepared, is in the range of up to about 30%, more preferably up to about 20% and still more preferably up to about 10% of the primary particle size, on a weight basis or, after suitable corrections are made for any voids which may be present in the product particles, on a volume basis.

The correction for voids is made because voids make the product appear larger than it would in the absence of voids and thus misleadingly suggest there has been agglomeration which did not in fact occur. This correction can be made by use of particle density measurements and optical methods.

According to one aspect of the invention, the total amount of heat utilized is in the range of about 500 (278) to about 25,000 (13,889) B.T.U.s (kilocalories) per pound (kilogram) of generally ellipsoidal particles produced. This total amount of heat includes heat utilized for heating, and for preheating if any, of the particles, of other combustible mixture components and of the combustible mixture itself. The total also includes heat utilized in expansion and for heat losses, including such heat losses as may be attendant to the use of cooling gas, where applicable.

The heat utilization is lower for easily fused particles such as perlite, and higher for difficultly fused particles such as silica. Feed materials can be rated by Penfield's "Material Fusibility Index" from 1 to 7. Using the present invention, and using this index as a discriminator for materials of differing resistance to fusion, it will be found that the claimed methods can provide products with a heat consumption, in B.T.U.s per pound of product, of less than about 7,000+(3000×(Material Fusibility Index)/7) or preferably less than about 5,000+(3000×(Material Fusibility Index)/7), which is equivalent, in Kcal/Kgram, to 3,889+

(1667×(Material Fusibility Index)/7) and preferably 2,778+ (1191×(Material Fusibility Index)/7). Note: BTU/lb× 0.55556=Kcal/Kgram.

Differences between the melting or softening temperatures of different feed materials and the extent of conversion of feed to generally ellipsoidal particles will require suitable adjustment of feed rate and/or heat input. An appropriate balance between feed particle size, melting or softening point and feed rate on the one hand and combustible gas composition and flow rate on the other, will be readily established by persons skilled in the art with the aid of this disclosure and without undue experimentation.

It is preferred that the particles be cooled rapidly after fusion has progressed to the desired extent. For example, a cooling rate in excess of about 100°, more preferably in excess of about 2000 or still more preferably in excess of about 3000 per second is preferred. Radiant and convective cooling of the particles is preferably assisted by cooling air brought into contact with the fused particles with a minimum of turbulence. This minimizes the potential for accretions resulting from collisions of still-molten or still-soft particles with one another or with surfaces of the production apparatus.

The entire fusion operation may be performed in one step, with at least partial conversion of irregularly shaped crystalline feed particles to generally ellipsoidal form. Thus, for example, about 15 to 100%, more preferably about 50 to 100% and still more preferably about 75 to 100% by volume of the solids content of the compositions of the invention will be in the form of generally ellipsoidal particles. For certain applications in which it is important to minimize the quantity of irregularly shaped particles found in the product, the percentage of generally ellipsoidal particles may be in the range of about 90 to 100% based on the solids content of the compositions.

When solid feed particles that have been previously melted are used, for example ground glass of any type, the present methods partake to that limited extent of prior flame polishing technology. However, the preferred mode for using the invention is as a direct fusion method, in which the feed material, or at least a substantial portion thereof, has not previously existed as a bulk melt. Thus, the term direct fusion is used to refer to methods by which irregularly shaped solid feed particles composed substantially of one or more specified materials may be dispersed, heated and melted or softened sufficiently to convert them, while maintaining them dispersed and suspended in hot gases and under the influence of surface tension, to generally ellipsoidal particles. This method of formation makes powders in which the constituent particles may have particle-to-particle variations in chemical composition, and in some cases residual crystallinity, of a kind not found in particles made by indirect methods.

While the particles may be pre-heated in any suitable manner, in the fusion step, heat is transferred to the feed particles through contact with flaming combustion gases in which the particles are dispersed. More particularly, the present method involves premixing and entraining feed particles in flowing combustible gases and heating them to fusion temperature by igniting the gases in the presence of the particles and maintaining the particles in a dispersed state in the flaming gases and possibly also for some distance downstream of the flame.

During their residence in the flame, and possibly during continued contact with the hot combustion gases outside the flame, the particles are maintained for a time at a temperature sufficient to soften or melt them to the extent that surface tension within the resultant fused or partially fused particles or droplets is sufficient to convert appreciable amounts of the feed particles to generally ellipsoidal form. The flow of particles as they progress from their original un-fused state to an at least partially fused state may be in any appropriate direction or directions, including for example horizontal and/or vertical, with vertical down-flow being preferred.

When operating in the above manner, it is possible to obtain partially fused bulk particulate products in which the average particle size, on a volume basis, is up to about 25, up to about 20, up to about 15 or up to about 10 microns, or the 90th percentile is up to about 60, up to about 40 or up to about 30 microns, also on a volume basis.

Obtaining products of still smaller particle size can be very valuable. The invention makes it possible to obtain glassy rhyolite, silica based and silicate based products with average particle sizes, on a volume basis, of up to about 8, or preferably, up to about 6 microns.

Possibly depending at least in part on whether the feed particles contain volatile material sufficient to create voids in is the product, operation with high concentration of feed in the combustible gas mixture and with efficient control of heat utilization, both of which have been described above, tend to produce one or more useful effects on the products. These effects may cause reduction in the specific gravity of the products, based on the density of the feed material, creation of void volume in the products, and the presence of some irregular feed particles in the products, or a combination of two or more of these effects.

The reductions in specific gravity may partly be the result of the presence of some hollow particles with trapped voids in the products or may be the result of a phenomenon related to the loss of crystallinity and conversion to a lower density "glassy" phase. Whatever their explanation, these reductions provide advantages in manufacturing and in application of the resultant powders. The increased volume and lower densities are generally preferred characteristics of the products, and even small volume increases can, over large production runs, provide equivalent volumes of salable products with considerable fuel savings. Thus, the specific gravities of the generally ellipsoidal products of the invention are preferably lower, in the range of about 1 to 15% and more preferably about 1 to about 10% lower, than the specific gravities of the feed materials.

Controlling the amount of heat energy released in the flame by adjusting or maintaining fuel, air mixture and feed material quantity or other process materials or conditions in such a way as to maintain some detectable voids in the product over and above those that are inevitably produced, such as in amounts as low as about 1 to about 3 percent, or about 1 to about 2 percent, leads to, and can be used as an indicator of, efficient use of combustion energy. Thus, it is preferred that process conditions be controlled to produce in the partially fused bulk particulate product at least about 1% of void volume, based on the volume of the product. However, the quantity of void volume in the product may be at least about 3 or at least about 5 percent. On the other hand the void volume may be up to about 12 or up to about 15 or up to about 20 percent. For example, void volumes in the range of about 1 to about 15 percent or about 1 to about 10 percent by weight are contemplated.

The above-indicated high feed concentration and controlled heat utilization may cause some irregular feed particles to be present in the products, whether significant quantities of voids are generated or not. This mode of operation is also advantageous from the standpoint of energy utilization, and may for example involve production of products containing up to about 99%, more preferably up to about 95% and even more preferably up to about 90% by volume of fused generally ellipsoidal discrete particles that are substantially glassy, with corresponding amounts of irregular product particles being present.

It is preferred that, in the compositions of matter according to the invention, the carbon content of the solid particles should be restricted. Other than carbon present in the form of organic material applied to the surfaces of the solid particles, it is preferred that the carbon content be limited to up to about 0.2%, more preferably up to about 0.15% or still more preferably up to about 0.1% by weight, based on the total weight of the solid particles.

Preferred products according to the invention have little or essentially no hematite, emery, magnetite, or other highly colored iron-containing minerals. They may, for example, contain up to about 0.2, more preferably up to about 0.1 and still more preferably up to about 0.05% by weight of $Fe_2O_3$ and/or $Fe_3O_4$. Similar limits apply to Manganese, e.g., MnO, and to those other metals whose oxides or other compounds tend to color the products. In the case of ferrous iron oxide, FeO, which is not so strongly colored, the preferred products may contain up to about 5%, more preferably up to about 2% and still more preferably up to about 1% by weight.

When practicing the invention with exercise of control over the kinds and amounts of carbon in the fuels and the kinds and amounts of carbon and other colorants in the feed materials, one can produce solid particle products having brightness levels that make the products particularly suitable for various end uses, certain of which are described below. For example, products with brightness levels of at least about 60 and preferably at least about 80 are contemplated.

Products of the invention may be characterized by having chemical compositions corresponding substantially with that of one or more feed materials, including mixtures thereof. The terminology "corresponding substantially with" is intended to embrace chemical compositions similar to those which would result from at least partial fusion of feed material composed substantially of at least one of the materials. However, the words corresponding substantially with have been chosen to embrace the possibilities that different production techniques can be employed and that there can be differences between the chemical compositions of the feed materials and those of the resultant products. For example, differences between feed material and product chemical compositions can result from departure of the loss on ignition materials and of varying amounts of other portions of the minerals as a result of high temperature volatilization, such other portions usually being in the range of up to about 5% by weight of the feed material.

When the feed materials or other portions of the solid feed particles include crystalline matter, the process of at least partial fusion destroys at least a portion of their crystalline character. The mechanism by which this occurs has not been proven, but it is theorized that at least portions of the respective particles are raised to temperatures above the dissolution temperature of the crystalline material. At least a portion and usually the major portion of the crystalline structure in the respective particles will be destroyed.

It should be understood that the resultant particles, although having reduced crystallinity, may not in every instance be properly described as fully amorphous. For this reason, the particulate product is referred to herein as "substantially glassy." This terminology is intended to include the possibility that generally ellipsoidal product particles may contain some but not all of their original crystallinity, while having been converted to a form with a generally ellipsoidal surface that resembles glass in terms of its smoothness, at least the surface portions of the product particles being amorphous in nature.

There is however no reason in principle why the crystal content of the generally ellipsoidal particles produced from the crystalline feed materials should not be reduced to a major extent. Thus, in these particles, it is contemplated and possibly also even preferred, that most if not all of the crystalline structure originally present in these particles should be destroyed during the fusion operation.

It is of course also contemplated that products according to the invention, containing generally ellipsoidal substantially glassy particles respectively including particles of particular chemical compositions may also contain particles of the same or other compositions that are or are not of a substantially glassy nature. Such particles that are not of a substantially glassy nature, having passed through a fusion zone, may or may not have undergone fusion, and in the latter case may retain most if not all of any original crystallinity and/or surface roughness which they may have originally possessed. Those fusion products that contain both significant amounts of crystallinity and of substantially glassy particles may be referred to as "crysto-morphic."

The crystallinity of products produced according to the invention may be tested "in gross," meaning that X-ray diffraction can be used to measure the crystallinity of samples containing both fused and essentially un-fused particles without measuring the quantum of crystallinity present in the two different kinds of products. Crystallinity that is so measured may be expressed in terms of a weight percentage, based on the total weight of the sample. Based on this mode of measuring, products containing up to about 90%, more preferably about 0.1 to about 75% and still more preferably about 5 to about 60% of crystallinity are contemplated. In some circumstances, nearly complete conversion to generally ellipsoidal products may occur in combination with surprisingly high residual levels, e.g., 20%, of crystallinity. Understandably, products produced from non-crystalline feed materials remain essentially amorphous or glassy.

A preferred form of apparatus which has been employed to produce the products of the present invention using the method of the present invention, and which has also been used to conduct the examples set forth below, will now be described with the aid of the drawings. It should be understood however that such apparatus disclosure is illustrative only, and that the invention is not intended to be limited by or to the particular apparatus described.

Figure 2:
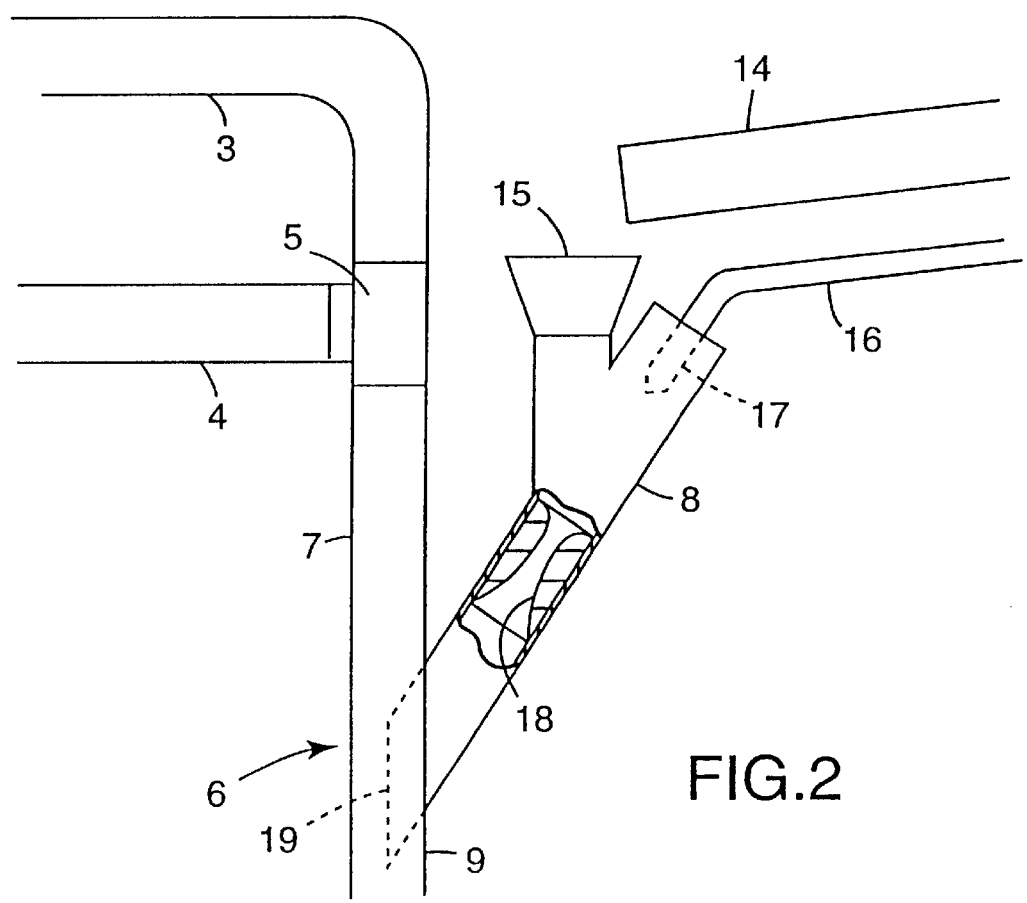
FIG. 2 is an enlarged portion of the apparatus of FIG. 1, disclosing a mixing device for assisting in dispersion of feed particles into a stream of combustible gases.

The illustrative equipment shown in FIGS. 1 and 2 includes separate sources 1 and 2 for oxygen-containing gas and fuel, which may or may not include facilities for pre-heating of the oxygen-containing gas and/or fuel. Thus, for example, filtered oxygen-containing gas is conducted from its source 1 through a suitable compressor or blower (not shown), valving (not shown) and flow measuring equipment (not shown) into oxygen-containing gas pipe 3 to provide an adjustable, stable flow of such oxygen-containing gas. Fuel gas, after passing from its source 2 through its own independent valving (not shown), flow measuring device (not shown) and delivery pipe 4 is adjustably drawn by aspiration and at a stable rate of flow into pipe 3 at junction 5. There, if needed or desired, a flow-control orifice is provided to properly match the volume of the fuel to the usually larger volume of oxygen-containing gas. For example where the oxygen-containing gas is air and the fuel is natural gas, a volume ratio of about 10:1 may be employed.

Pre-mixing of the resulting combustion-supporting gas mixture with feed material prior to igniting the fuel may be performed in a Y 6, a generally "Y"-shaped mixing connection having upper intersecting gas and feed entry legs 7 and 8 which join and feed together into a lower exit leg 9. Gas entry leg 7 is a vertically oriented extension of oxygen-containing gas pipe 3. Feed entry leg 8 also extends upwardly but is inclined from the vertical, intersecting at an acute angle, for example about 10–45°, with gas entry leg 7.

A uniform rate of flow of feed into feed entry leg 8 is effected by feeding the feed under moderate humidity and temperature, e.g., at room temperature, from a vibrating discharge funnel 13 onto a vibratory conveyor 14 and from that conveyor into inlet 15 of the feed entry leg. Loss-in-weight screw feeders with mechanically stirred hoppers and vibration assisted discharge are useful for feeding very fine powders. Supply pipe 16 provides a supply of dispersion gas such as air, which may thus represent a small portion of the combustion-supporting gas to be burned. As shown in greater detail in FIG. 2, which is an enlarged, partial cross section of FIG. 1, dispersion gas discharged from supply pipe 16 passes through jet nozzle 17 into feed entry leg 8 to aspirate feed from inlet 15 into leg 8 and through venturi 18 to assist in dispersion of the feed particles. Particles of feed, pre-dispersed in dispersion gas, are delivered through chamfered end 19 of feed entry leg 8 into the intersection of Y 6, where they are then mixed with and further dispersed in the combustion gases passing downward mechanically through gas entry leg 7.

Dispersal of the feed in the combustion gases can be achieved and enhanced by selection of the ratio of gas to feed mixed in the Y and the volume rate of gas flow per unit of cross-section of the gas tube provided by the continuation of gas entry leg 7 into exit leg 9 of Y 6. In experiments conducted in the apparatus described herein, ratios in the range of about 0.9 to about 9 pounds of feed per 1000 ft.$^3$ (cubic feet at 15° C.) of fuel-air mixture were used. The combustible gas through-put was for example 400 ft.$^3$/hour through a gas tube having an area of about one square inch. Persons skilled in the art will appreciate that the ranges of ratios and velocities that will work in other types of equipment, and the ranges that will work to best advantage in such other equipment, may vary from the values just given and can be found through tests which such persons can readily conduct with the aid of this disclosure and without undue experimentation. It is particularly important to maximize the amount of combustion-supporting gases injected into the feed particles by high-energy jets to accelerate the feed particles and break up agglomerates by shear and impact. For adequate dispersal of fine powders at high rates, the particles and combustion air can be dispersed by passing them through a hammermill, disc mill or other deagglomerating device, functioning as the sole dispersion means or as an upstream pre-treatment for feed particles that will also be dispersed with the aid of fluidizing agent and/or the disclosed air jet.

In the present preferred embodiment, as may be seen in FIG. 1, the burner 20 is a downwardly discharging "stick-tight" gas burner having a 1.75 inch diameter flame-retaining nozzle 22 adapted so that the internal pilot is fed by separate air and gas stream free of feed particles. Such a burner is described at page 431 of the above-mentioned Reed work. In the present embodiment, this burner has at its top a common inlet 21 for the particle and combustion-supporting gas mixture, received from exit leg 9 of Y 6.

Nozzle 22 of burner 20 penetrates the upper, horizontal wall 26 of a combustion chamber 27. An annular opening in wall 26 surrounding the outer, peripheral surface of nozzle 22 represents an inlet port 28 for cooling air. A short distance below this port, at the bottom of nozzle 22, is a generally horizontal burner mouth 29 for the discharge of combustible gas and entrained feed into combustion chamber 27. Combustion occurs as the particle-combustible gas mixture exits burner mouth 29 and continues downward in combustion chamber 27.

While it is possible to widely vary the internal cross-sections of the above-mentioned gas channel in the Y and of the burner, a certain balance between these dimensions should be maintained. The objective to be satisfied in selection of these dimensions is keeping feed particles dispersed in the resulting flame, while keeping sufficient velocity of flow through burner mouth 29, given the available volume rate of the gas and feed, to discourage or effectively bar "back-fire," retreat of the flame into the interior of burner 20. As those skilled in the art will appreciate, a variety of other burner designs are available which can accomplish these objectives.

It is believed beneficial to generate the flame from the burner in a "wall-free" environment. By this it is meant that the side walls 32 of combustion chamber 27 are positioned at a predetermined distance laterally or transversely from the path of the flame emanating from burner mouth 29. There should be a sufficient distance laterally or transversely from the perimeter of the flame to the walls 32 to afford the flame a substantial amount of freedom to expand in the lateral or transverse direction. Alternatively, this distance should be sufficient to substantially inhibit or substantially prevent molten or soft and still unsolidified particles that have been at least partially fused in the flame from contacting the side walls 32 and adhering thereto. Preferably, the distance should be sufficient both to afford the freedom to expand and to inhibit the adherence of particles, as above described.

In the present burner embodiment, burner mouth 29 is located on the extended axis 33 of the burner and projects a flame along that axis, generally in the direction in which the axis extends. Thus, in this case, the side walls 32 are positioned at a predetermined lateral or transverse distance from that axis, to provide the freedom and/or inhibition described above. The side walls 32 may be of any suitable configuration, but are cylindrical in the present embodiment, as viewed in a plane perpendicular to axis 33, and have a diameter of about 3 feet.

Prior art suggests introducing cooling gas to the combustion area, perpendicular to the path of the flame and presumably a short distance downstream from the burner. According to those teachings, the flame disappears where it contacts the cooling gas, and the technique could thus be used to control the amount of time during which feed particles are held at fusion temperature. That system may optionally be used with the present invention. However, the present invention also provides and preferably employs a different and advantageous cooling technique, as described below.

In connection with the present invention it has been found that assistance in isolating molten or soft particles from the combustion chamber side walls 32, and in some cases from the upper wall 26, can be obtained from a current of cooling gas, such as air introduced through the above-mentioned port 28. This current may for example, and preferably is, caused to pass gently in co-current flow along the side of the flame between the flame and one or more of such walls. The term gently, as used herein, signifies that the direction and/or rate of flow of the cooling gas is co-current with the flame and allows lateral expansion of the combustion gases. This co-current flow occurs at least along an appreciable portion of the length of the zone in which flame is present in the hot combustion gases, and possibly also for an appreciable distance downstream of that zone.

It is recommended that the cooling gas direction be established or controlled in a way such that the hot combustion gases can continue to expand laterally and the cooling gas can flow cocurrently downstream for an appreciable distance with such gases, during which the combustion gases may continue to expand laterally. In aid of this goal it is recommended that the cooling gas linear flow rate be controlled or sufficiently limited to substantially inhibit or substantially prevent the cooling gas flow from generating turbulent flow at the central axis, or in the core, of the adjacent hot combustion gases.

It should be understood however that the mere presence of cooling gas adjacent the hot combustion gases, especially when it is substantially cooler and/or substantially slower-moving than the combustion gases, will encourage formation of some eddy currents in the outer or peripheral portion of the combustion gases. Thus, the goal of the foregoing limits or control that are impressed upon the cooling gas is the substantial inhibition or substantial prevention of any tendency for the cooling gas to bring about an immediate overall disruption of the flame, and preferably also of the flow of combustion gases that continues downstream from the zone in which flame is present. In the present embodiment, in which the air inlet port 28 that surrounds burner nozzle 22 in combustion chamber upper wall 26 is substantially annular, cooling air is admitted to the chamber in the form of a moving curtain, induced by the draft produced by the burner and downstream collection equipment, that substantially entirely surrounds the flame while performing the particle dispersion, agglomeration inhibition and other cooling gas functions described above. Optionally, additional air, water, or other suitable dilution gas can be admitted to the combustion chamber downstream of the burner. In any case, enough cooling is preferably introduced to bring the hot gases to below about 800 to about 1200° C. before entering ducts for conveyance to collection devices.

Any suitable means and measures may be used to collect the at least partially fused particulate product. Persons skilled in the art are well aware of suitable systems. In the present embodiment combustion chamber 27 has an integral hopper section 36 with a conical or upright funnel-like bottom section 37 into which product falls by gravity and/or is drawn by the draft provided by downstream collection equipment. An outlet 38 at the bottom of hopper 36 is connected through conduit 39 with collection equipment, such as a gas-solids separator 40, which may be of the cyclone type having top and bottom outlets 41 and 42 for gases and particulate products respectively. Outlet 41 may be connected to a bag filter (not shown), if desired, and to a blower (not shown) to provide a draft through the collection equipment.

In the fusion of feed particles by the above described method, sufficient heat is transmitted to the particles, while dispersed, to cause enough softening or melting in the respective particles so that surface tension is able to convert an appreciable portion of them from their original irregular form to a substantially more regular shape, while providing them with smooth surfaces. Then the particles are kept out of contact with one another and with other surfaces until they have been cooled to a non-tacky state.

If it were possible for each individual particle to undergo fusion and experience the effects of surface tension with no interference by air currents, by other particles or by fusion apparatus components, with no particle composition inhomogeneities, with sufficient time at a suitable viscosity, and with uniformly rapid cooling, the resultant product particles would be perfectly spherical. However, in practice, a certain amount of interference, inhomogeneities and variations in residence time and viscosity will occur. Thus, to some extent, there will be product particles that are less than perfectly spherical.

Some of these less than perfectly spherical particles may be quite irregular in shape, and in some instances a substantial percentage of irregular particles will be retained intentionally in the resultant products. Yet, the objects of the invention are attained when a substantial portion of the irregular feed particles are converted to a form that appears at least generally ellipsoidal when viewed under magnification as described below and when the resultant product, as originally produced, or as packaged, or as combined with other materials for any suitable end use, contains about 15 to about 99%, or about 50 to about 99%, or about 75 to about 99% or about 90 to about 99% by volume of generally ellipsoidal particles.

According to a particularly preferred embodiment of the invention, the products contain substantially spherical particles in amounts within at least one of these volume percentage ranges. More particularly, for those end uses in which discreteness of the product particles is deemed important, it is preferred that, in the compositions of matter according to the invention, the above identified portion of the resultant product that represents about 15 to 100% by volume of generally ellipsoidal particles should itself contain about 50 to about 99%, more preferably about 70 to about 99% and still more preferably about 90 to about 99% by volume of substantially discrete particles.

"Generally ellipsoidal" particles are those whose magnified two-dimensional images appear generally rounded and free of sharp corners or edges, whether or not they appear to have truly or substantially circular, elliptical, globular or any other rounded shape. Thus, in addition to the truly circular and elliptical shapes, other shapes with curved but not circular or elliptical outlines are included.

"Substantially spherical" particles are those whose magnified two-dimensional images appear at least substantially circular. A particle will be considered substantially spherical if its outline fits within the intervening space between two concentric, truly circular outlines differing in diameter from one another by up to about 10% of the diameter of the larger of these outlines.

In general, a given particle will be considered "substantially discrete" if the outline of its image does not touch or overlap that of any other particles visible in a magnified view of the given particle and of such other particles. However, a given particle will still be considered substantially discrete if its image touches or overlaps the outline of one or any number of other particles, if the largest visible dimensions of all such other particles are respectively in the range of up to about 10% of the largest visible dimension of the given particle.

Shape, discreteness and particle size of feed material and product particles may in general be judged by viewing their two-dimensional photographic images at a magnification of ×1000, as in FIGS. 3 and 4 herein. Such images may be provided by an optical or scanning electron microscope or by a suitable alternative magnifying device at the same or equivalent magnification. Only particles entirely visible within the image under review are considered in applying the above definitions and in determining quantities of particles present. Samples used for such analyses should, unlike FIGS. 3 and 4, be prepared in a manner that sufficiently scatters the particles in the magnified views in order to minimize particle-to-particle overlap of discrete particles. The number of particles counted for determining the volume percentage of particles of a particular type in a sample should be sufficient to provide an acceptable level of confidence, such as about 95%.

The definitions of generally ellipsoidal, substantially spherical and substantially discrete given above are applied on the basis of the above-described images as viewed at the indicated magnification, even if the particles in question would not conform to these definitions if viewed at higher levels of magnification. Thus, for example, particles whose outlines appear rounded and whose surfaces appear mostly or substantially entirely smooth at this level of magnification should be considered generally ellipsoidal even if they may appear less rounded and/or less smooth at higher levels of magnification.

Determinations of particle size, discreteness and volume percent for particles of different sizes and shapes, whether generally ellipsoidal, substantially spherical or irregular, may be based on procedures described in *Handbook of Mineral Dressing*, by A. F. Taggart, John Wiley & Sons, Inc., New York, 1945, chapter 19, pages 118–120. Many refinements of this basic method are known to those skilled in the art. For instance, one may analyze the magnified two-dimensional images of suitably prepared samples using a Leica Q570 image analysis system in conjunction with a Leitz Ortholux microscope or a source that inputs data from scanned SEM (scanning electron microscope) micrographs.

Such automated image analysis systems can make direct measurements of particle area, perimeter and aspect ratio to determine equivalent circular diameter values for the two-dimensional images of all observed particles, regardless of shape. These substantially correspond to the actual values for all observed particles. Such systems readily determine equivalent circular diameter values for particles in selected particle size categories.

When supplied by the operator with a suitably defined "discriminating factor," such systems can distinguish particles that are substantially ellipsoidal or substantially spherical from those that are not and can determine area values that substantially correspond with the aggregate areas of the particles within and without these categories. A discriminating factor that has been used with apparently acceptable results for distinguishing generally ellipsoidal particles from those that are not, and which may or may not be subject to further refinement, is as follows:

CSF÷AR>0.55, wherein

CSF=circular shape factor ($4\pi \times$area of particle÷particle perimeter$^2$) as derived by the system and AR=aspect ratio (largest particle dimension or diameter÷smallest particle dimension or diameter) as derived by the system.

The respective aggregate image areas for particles whose images are and are not within the generally ellipsoidal or substantially spherical category may then be converted to volume percentages by formulas familiar to persons skilled in the art.

Automated image analysis systems of the above type are available with displays on which an operator may view particles under analysis. Such displays permit the operator to visually discriminate between particles that are and are not in a selected category, for example generally ellipsoidal, substantially spherical or substantially discrete, as above defined. Particles so identified may be selected for inclusion in groups of particles whose aggregate areas may then be determined automatically, followed by conversion of these areas to volume percentages as above described.

The following examples, conducted in apparatus as depicted in FIGS. 1 and 2, offered as illustrations, are not intended to limit the scope invention.

EXAMPLE 1

800 grams of Kansas volcanic ash (72.8% $SiO_2$; 14.6% $Al_2O_3$; 5.8% $K_2O$; 3.9% $Na_2O$; 0.75% $Fe_2O_3$; 0.28% CaO; 2% $H_2O$) is placed in a jar mill with 20 grams of hexamethyldisilazane and 1500 grams of ¼" alumina balls. After tumbling for ten hours the ash is recovered as a free-flowing powder with 90 percent of the somewhat platy, irregularly shaped, particles having a diameter of less than 10 microns and a density of 2.5 g/cc.

Into the apparatus of FIGS. 1 and 2, air is metered to the oxygen-containing gas pipe 3 at about 270 ft.$^3$/hr (cubic feet per hour at 20° C.). Natural gas, with a heating value of 1,000 B.T.U./ft.$^3$ is separately metered and aspirated into pipe 3 from fuel delivery pipe 4 at junction 5 at about 35 ft.$^3$/hr. An additional 80 ft.$^3$/hr. of air is injected from supply pipe 16 and nozzle 17 through venturi 18 into the feed entry leg 8 of Y 6.

Over a period of about 6.6 minutes, one hundred grams of the ash, aspirated and entrained with a stoichiometric mixture of air and natural gas as above described, is supplied to a downward directed flame of about 35,000 btu per hour in the apparatus of FIGS. 1 and 2. The mixture of hot gases and entrained ellipsoidal particles is cooled by mixing with room temperature air.

Using a cyclone, the solid particles are separated from the gases. The powdered product has a density of 2.1 g/cc and an average particle size of 4.5 microns. Greater than 90 percent of the ash ellipsoidal particles contain a void, visible on microscopic observation, and these "bubbles" account for the reduction in average particle density compared with the starting volcanic ash.

EXAMPLE 2

Synthetic precipitated silicas products: "FK320"; "FK16"; "SIPERNAT 22"; "SIPERNAT D17"; and "EXTRUSIL", and a synthetic alumino silicate, "SIPERNAT 44", are obtained from the Degussa Corporation. Each of these powders, which contain from 3 to 22 percent water, is dispersed into a stoichiometric flame of air and natural gas in the above described manner to produce powders with an abundance of spherical particles with average particle diameters of a few microns. Once again voids are evident in some of the otherwise spherical particles.

Industrial Applicability

It is expected that products according to the invention will be supplied to industry as compositions of matter that are composed substantially of the solid particles, including generally ellipsoidal particles with or without particles of other shapes. However, due to the diverse practical uses of the particulate products, it is expected that compositions of matter of the present invention, referred to in the accompanying claims, will take many different and varied forms. Some illustrations are given below.

Compositions of matter comprising the solid particles disclosed herein may take the form of mixtures of such solid particles, including the generally ellipsoidal particles, with polymeric materials of all types, for instance thermoplastic and thermosetting resins, elastomers and other forms, including for example all materials popularly known as plastics. In such mixtures, the volume of solid particles, based on the total volume of such particles and polymeric material, can vary through out the range of about 0.05% (e.g., when small amounts of particles are present in films as anti-blocking agents) to about 99.9% (e.g., when small amounts of polymer are present as a surface treatment on the particles).

Katz and Milewski, supra, at pages 311 to 315, discuss uses of glass beads in polymeric materials. The products of the invention will be useful in many of these applications, especially since the invention provides an economical source of generally ellipsoidal particles in the range of up to about 15 microns in average diameter. Similarly, with only minor formulation adjustments, the generally ellipsoidal particles will be useful for most if not all of the applications described in the literature for fused silica, spherical alumina, silica, feldspar, calcium carbonate, nepheline syenite, alumina trihydrate and other particulates used as additives or neat powders. Products of this invention can replace at least partly and in many cases fully the volume of particulate additives used or contained in a given application or formulation. only minor additional adjustments to attain the desired viscosity, texture or other properties of importance will be required.

Particles in the size range with an average diameter of about 15 microns or less are important for producing composites, including molded products and laminates, with smooth surfaces that have high resistance to abrasion and staining. Consequently, these particles will be especially useful in amino polymer plastics, polyesters, phenolics, epoxies and other resins used for preparing a wide variety of molding compounds and molded members for the electrical transportation industry and other industries, as well as for preparing laminating mixes, laminates and other items for counter tops, vanities and other applications for the building and construction industries. For these purposes, the solid particles of the present invention, in their various mixtures with polymeric material, are preferably present in amounts of about 5 to about 65% by volume, based on the volume of the entire composition.

Another valuable end-use is in polymeric films of any kind that contain said solid particles. For example, when incorporated in polymeric films in a sufficient amount, the particulate products impart anti-blocking properties to said films. To illustrate, homogeneously blending about 0.05 to about 0.5% by volume of these products into polyethylene and/or other films enables those films to be stored in layered (including wound) form under typical warehouse conditions, e.g., at film temperatures up to about 45° C., without "blocking" or fusing of the film layers to one another. In preferred products for these anti-blocking applications, 90 to 100% by volume of the particles have diameters of up to about 25 microns and about 80 to 100% by volume of the particles are generally ellipsoidal.

Extenders for paint represent another valuable application. Economical availability of products with low color in small sizes that are abundant in rounded particles makes it possible to add these products to liquid coating compositions as fillers at loadings in the range of about 5 to about 50% of the total volumes of said compositions. With particulate products having very small particle sizes and an abundance of substantially spherical particles, only relatively modest viscosity increases, e.g., less than half the viscosity increase that would be expected when using fillers in the form of typical irregularly shaped particles, are experienced. Preferred examples of particulate products useful for such applications are those having Color Quest 457 nanometer brightness of at least about 60, more preferably at least about 70 and still more preferably at least about 80, with about 90 to 100% by volume of the particles having diameters in the range of up to about 25 microns and with about 75 to 100% by volume of the particles being generally ellipsoidal or substantially spherical.

Also, the compositions of the present invention include liquid coating compositions that are curable to solid decorative or protective coatings, including architectural paints, industrial coatings, wood stains and other coatings. In these compositions, the particulate materials may be used if desired to displace other ingredients that are expensive or environmentally troublesome, such as solvents. Also, products composed to a large extent of rounded particles, for example those that contain about 70 to about 100% by volume of generally ellipsoidal particles, can be incorporated in coatings to provide improved durability.

The products of the invention can also be used in coatings in sufficient amounts to impart controlled surface texture to them and thereby to provide gloss reduction and "flatting" effects in combination with improved stain and scrub resistance. Products in which about 90 to 100% by volume of the particles have diameters of up to about 25 microns and which contain about 60 to 100% of generally ellipsoidal particles are preferred for these applications.

The solid particles of the present invention, which can readily be made with melting points higher than those of glass beads, are potentially useful in shaped metallic members of the kind that include a matrix of metallic material in which said solid particles are dispersed, for example as an additive to improve durability or hardness. Such metallic materials may for example be selected from among zinc, aluminum and alloys containing at least one of said metallic materials. In such compositions, the products of the invention offer potential savings in both weight and cost.

Inert, non-abrasive generally ellipsoidal fillers are useful in soap and cosmetic formulations, because of the smooth texture they impart to such formulations. Thus, it is possible to provide compositions in the form of smooth-textured fluent or spreadable material comprising the solid particles of the present invention dispersed in a pharmacologically acceptable vehicle for application to the skin or other body parts of humans or animals. Freedom of the particulate products from heavy metals and other noxious materials will be required in many if not all of these applications. In the products preferred for these applications, about 90 to 100% by volume of the solid particles will have diameters in the range of up to 10 microns and about 90 to 100% by volume of the particles will be generally ellipsoidal or substantially spherical.

The paper industry has large requirements for specialty fillers of all types, and the invention offers the opportunity of formulating papers with a high degree of surface smoothness and durability. Thus, the invention makes possible compositions of matter in the form of smooth-surfaced webs comprising woven or non-woven fibers as the principal structural elements of the webs, with the solid particles of the invention being present in said webs as an additive, whether or not such webs include polymeric material. For these applications, products with average particle sizes in the range of up to about 10 microns are preferred.

Solid particles in accordance with the invention are useful for preparing many caulks, organic and inorganic cements, and other compositions. Among these are compositions of matter in the form of smooth-textured fluent or spreadable adhesives comprising said solid particles dispersed therein. It is anticipated that products of this invention that are abundant in rounded particles, preferably those containing about 50 to 100% by volume of generally ellipsoidal or substantially spherical particles and having an average particle size in the range of up to about 10 microns, will be useful as additives for modifying the properties of adhesives, providing combinations of tack, elasticity, elongation and possibly other properties that were not previously available. Other useful compositions include powders comprising at least an inorganic cement-forming component in admixture with said solid particles. White grades of the products of the invention are useful in these compositions where appearance is an important feature. For example transparent products having a Color Quest 457 nanometer brightness of at least about 80 and average particle diameters in the range of up to about 10 microns are preferred for use in dental compositions.

Katz and Milewski, supra, in chapter 4, describe using mixtures of particles with large and small diameters to provide combinations with high "packing" factors or high bulk density. Such combinations are important for the formulation of composites in which generally ellipsoidal particles represent a very high volume percentage of the solid particles therein, and consequently contain a minimum of other ingredients. Composites giving high performance at elevated temperatures, such as may be used in aerospace and other applications, are made possible by such formulating techniques. The invention makes readily available products that are abundant in particles within the small size ranges needed for these mixtures.

The generally ellipsoidal particles of this invention, either by themselves or in combination with other materials, including for instance other kinds of solid or cellular particulates, can be used to form non-flowable porous structures. The particles of such structures may be rendered temporarily or permanently adherent to one another by high-temperature sintering or by bonding the particles together in bulk, such as with small additions of adhesives or cements. These products are useful in block, slab, or other shaped forms to act as lightweight structural materials. By suitable selection of particle size and level of bonding agents, the porosity of these materials can be controlled to provide utility as filters, such as for gases and/or liquids.

Particles in accordance with the invention are useful in curable liquid and solid polymeric compositions generally. At least some of them are however particularly useful in UV-curable compositions due to their relatively high UV transparency, as compared with other fillers.

Neat or powdered forms of the products of this invention, because of the rounded particle shapes, have an unusual degree of lubricity or slipperiness to the touch. This property causes those embodiments of the invention which are abundant in free flowing generally ellipsoidal particles to be useful in a wide range of applications, such as lubricants for a variety of friction control applications, powders for skin protection, slip agents between film and paper layers and agents for controlling the tackiness or stickiness of surfaces in general.

Any form of surface treatment with silane coupling agents, organic titanates, surfactants, dispersants, wetting agents, etchants (acidic or basic), or other agents, and any other method of surface modification, may be used to enhance the performance of the generally ellipsoidal particles in any application. See *Silane Coupling Agents*, Plueddemann, E. P., 2d Ed., Plenum Press, 1991. For additional information regarding organic titanate and silane coupling agents, to improve bonding with polymeric materials, see also U.S. Pat. Nos. 3,834,924 to Grillo, U.S. Pat. No. 3,290,165 and U.S. Pat. No. 3,567,680 to Iannicelli, and U.S. Pat. No. 4,268,320 and U.S. Pat. No. 4,294,750 to Klingaman and Ehrenreich.

The end-uses of the products of the present invention that are described above are those which presently appear most attractive. The foregoing disclosures of embodiments of the invention and end-uses therefor have been given merely for purposes of illustration and not to limit the invention. Thus, the invention should be considered to include all embodiments falling within the scope of the following claims and equivalents thereof.

What is claimed is:

1. A composition of matter comprising solid particles wherein:
    A. at least a portion of said solid particles are generally ellipsoidal particles that are substantially glassy;
    B. at least a portion of said solid particles respectively constitute product particles produced by at least partial fusion of feed particles while they are flowing in suspension in hot combustion gases, said feed particles containing volatile material ranging in amount from about 1 to about 25% by weight based on the weight of the feed particles,
    are derived from, and have chemical compositions corresponding substantially with the chemical composition of, one or more silicas and/or silicates present in naturally occurring mineral deposits, except that the amount of volatile material in the product particles may differ from the volatile content of the corresponding naturally occurring mineral,
    have a Color Quest 457 nanometer brightness of at least about 60,
    have an average particle size by volume in the range of up to about 15 microns, and
    include at least about 1% of void volume, based on the volume of the product particles; and
    C. said composition of matter comprises about 15 to 100% by volume of said generally ellipsoidal particles that have said chemical compositions, based on the total volume of solid particles present in said composition of matter.

2. A composition of matter according to claim 1 comprising wherein at least 50% by volume of generally ellipsoidal or substantially spherical particles.

3. A composition of matter according to claim 1 comprising about 75 to 100% by volume of generally ellipsoidal or substantially spherical particles.

4. A composition of matter according to claim 1 comprising about 15 to 90% by volume of said generally ellipsoidal particles.

5. A composition of matter according to claim 1 comprising about 15 to 95% by volume of said generally ellipsoidal particles.

6. A composition of matter according to claim 1 comprising about 15 to 99% by volume of said generally ellipsoidal particles.

7. A composition of matter according to claim 1 consisting of said generally ellipsoidal particles.

8. A composition of matter according to claim 1 consisting of said generally ellipsoidal or substantially spherical particles.

9. A composition of matter according to claim 1 wherein at least a portion of said solid particles has a chemical composition corresponding substantially with that of at least one silica.

10. A composition of matter according to claim 1 wherein at least a portion of said solid particles has a chemical composition corresponding substantially with that of a known, naturally occurring mineral species which contains calcium silicates).

11. A composition of matter according to claim 1 wherein at least a portion of said solid particles has a chemical composition corresponding substantially with that of known, naturally occurring species which contains one or more silicates selected from the group consisting of calcium silicate(s), sodium silicates, potassium silicates, lithium silicates, volcanic ashes and other materials of volcanic origin.

12. A composition of matter according to claim 1 wherein said composition of matter is derived from feed material in which the volatile material is chemically bound to the feed particles.

13. A composition of matter according to claim 1 wherein at least a portion of said feed particles has been dried prior to combustion.

14. A composition of matter according to claim 1 wherein said composition of matter is derived from feed particles which have been treated to add volatile material.

15. A composition of matter according to claim 1 wherein said composition of matter is derived from feed particles to which volatile material has been added prior to the fusion step by dissolving and precipitating said silica(s) and/or silicate(s).

16. A composition of matter according to claim 1 wherein said composition of matter is derived from feed particles which have been treated prior to the fusion step to reduce their content of volatile material.

17. A composition of matter according to claim 1 wherein said composition of matter is derived from feed particles which have not been treated to add volatile material.

18. A composition of matter according to claim 1 wherein said composition of matter is derived from silica(s) and/or silicate(s) which have remained solids from the time of their extraction from the earth until their suspension in said hot combustion gases.

19. A composition of matter according to claim 1 wherein the amount of volatile material in the product is less than the amount of volatile material in the corresponding naturally occurring mineral and/or in said feed material.

20. A composition of matter according to claim 1 wherein the silicate and/or silicates present in the naturally occurring mineral deposits contain(s) at least 1 percent by weight of volatile material(s).

21. A composition of matter according to claim 1 wherein the silicate and/or silicates present in the naturally occurring mineral deposits contain(s) at least 2 percent by weight of volatile material(s).

22. A composition of matter according to claim 1 wherein the silicate and/or silicates present in the naturally occurring mineral deposits contain(s) up to about 7 percent by weight of volatile material(s).

23. A composition of matter according to claim 1 wherein the silicate and/or silicates present in the naturally occurring mineral deposits contain(s) up to about 10 percent by weight of volatile material(s).

24. A composition of matter according to claim 1 wherein the silicate and/or silicates present in the naturally occurring mineral deposits contain(s) up to about 25 percent by weight of volatile material(s).

25. A composition of matter according to claim 1 wherein said solid particles have a carbon content of up to about 0.2% by weight, based on the total weight of the solid particles.

26. A composition of matter according to claim 1 wherein said solid particles have a carbon content of up to about 0.15% by weight based on the total weight of the solid particles.

27. A composition of matter according to claim 1 wherein said solid particles have a carbon content of up to about 0.1% by weight based on the total weight of the solid particles.

28. A composition of matter according to claim 1 wherein said solid particles contain small amounts of highly colored iron-containing minerals.

29. A composition of matter according to claim 1 wherein said solid particles contain small amounts of any material selected from the group consisting of $Fe_2O_3$, $Fe_3O_4$ FeO, manganese and mixtures of these.

30. A composition of matter according to claim 29 wherein said solid particles comprise up to about 0.2% by weight of any of said materials.

31. A composition of matter according to claim 29 wherein said solid particles comprise up to about 0.1% by weight of any of said materials.

32. A composition of matter according to claim 29 wherein said solid particles comprise up to about 0.05% by weight of any of said materials.

33. A composition of matter according to claim 29 wherein said solid particles comprise up to about 5% by weight of FeO.

34. A composition of matter according to claim 29 wherein said solid particles comprise up to about 2% by weight of FeO.

35. A composition of matter according to claim 29 wherein said solid particles comprise up to about 1% by weight of FeO.

36. A composition of matter according to claim 1 wherein said solid particles are amorphous.

37. A composition of matter according to claim 1 wherein said solid particles are partially crystalline.

38. A composition of matter according to claim 37 wherein said solid particles are up to about 90% crystalline.

39. A composition of matter according to claim 37 wherein said solid particles are about 0.1 to about 75% crystalline.

40. A composition of matter according to claim 37 wherein said solid particles are about 5 to about 60% crystalline.

41. A composition of matter according to claim 1 wherein said generally ellipsoidal particles have an average particle size by volume in the range of up to about 10 microns.

42. A composition of matter according to claim 1 wherein said generally ellipsoidal particles have an average particle size by volume in the range of up to about 8 microns.

43. A composition of matter according to claim 1 wherein said generally ellipsoidal particles have an average particle size by volume in the range of up to about 6 microns.

44. A composition of matter according to claim 1 wherein the specific gravities of the generally ellipsoidal particles differ from the specific gravities of the feed particles.

45. A composition of matter according to claim 1 wherein the specific gravities of the generally ellipsoidal particles are lower than the specific gravities of the feed particles.

46. A composition of matter according to claim 45 wherein said specific gravities of the generally ellipsoidal particles are in the range of about 1 to about 15% lower than the specific gravities of the feed particles.

47. A composition of matter according to claim 45 wherein said specific gravities of the generally ellipsoidal particles are in the range of about 1 to about 10% lower than the specific gravities of the feed particles.

48. A composition of matter according to claim 1 wherein the void volume is in the range of about 1 to about 20 volume percent.

49. A composition of matter according to claim 1 wherein the void volume is at least about 3 percent.

50. A composition of matter according to claim 1 wherein the void volume is at least about 5 percent.

51. A composition of matter according to claim 1 wherein the void volume is up to about 12 percent.

52. A composition of matter according to claim 1 wherein the void volume is up to about 15 percent.

53. A composition of matter according to claim 1 wherein the void volume is up to about 20 percent.

54. A composition of matter according to claim 1 wherein the product particles have a Color Quest 457 nanometer brightness of at least about 70.

55. A composition of matter according to claim 1 wherein the product particles have a Color Quest 457 nanometer brightness of at least about 80.

56. A composition of matter according to claim 1 wherein said composition comprises said solid particles and a polymeric material.

57. A composition of matter according to claim 56 wherein the volume of said solid particles, based on the total volume of such particles and polymeric material is in the range of about 0.05% to about 99.9%.

58. A composition of matter according to claim 56 wherein said polymeric material is a film.

59. A composition of matter according to claim 58 wherein said composition comprises about 0.05 to about 0.5% by volume of said solid particles.

60. A method for reducing friction of a material, which comprises applying a composition of matter according to claim 59.

61. A composition of matter according to claim 1 wherein said composition comprises said solid particles in a curable liquid composition.

62. A composition of matter according to claim 1 wherein said composition comprises said solid particles in a curable solid composition.

63. A composition of matter according to claim 61 or 62 wherein said curable composition is UV curable.

64. A composition of matter according to claim 1 wherein said composition is a liquid coating composition which comprises said solid particles.

65. A composition of matter according to claim 64 wherein said composition comprises 5 to 50% based on the total volume of the composition as a whole.

66. A composition of matter according to claim 1 wherein said composition comprises said solid particles and a metallic material.

67. A composition of matter according to claim 1 wherein said composition comprises said solid particles and an inorganic cement forming component.

68. A composition of matter according to claim 1 wherein said composition is a caulk.

69. A composition of matter according to claim 1 wherein said composition is a cement.

70. A composition of matter according to claim 1 wherein said composition is an adhesive.

71. A composition of matter according to claim 1 wherein said composition is a smooth-textured fluent or spreadable material.

72. A composition according to claim 71 wherein said solid particles are dispersed in a pharmacologically acceptable carrier.

73. A composition of matter according to claim 1 wherein said composition is a smooth-surfaced web.

74. A composition of matter according to claim 73 wherein said generally ellipsoidal particles have an average particle size of about 10 microns.

75. A composition of matter according to claim 1 wherein said generally ellipsoidal particles of said composition of matter adhere to one another.

76. A composition of matter according to claim 75 wherein said composition has a shaped form.

77. A method for treating skin, which comprises applying a composition of matter that contains the solid particles of claim 1.

78. A method for improving the resistance of surfaces to abrasion, which comprises applying a composition of matter that contains the solid particles of claim 1.

79. A method for improving the resistance of surfaces to stains, which comprises applying a composition of matter that contains the solid particles of claim 1.

80. A method for reducing friction of a material, which comprises applying a composition of matter that contains the solid particles of claim 1.

81. A composition of matter comprising solid particles wherein:
  A. at least a portion of said solid particles are generally ellipsoidal particles that are substantially glassy;
  B. at least a portion of said solid particles respectively constitute product particles produced by at least partial fusion of feed particles while they are flowing in suspension in hot combustion gases, said feed particles containing volatile material ranging in amount from about 1 to about 25% by weight based on the weight of the feed particles,
  are derived from, and have chemical compositions corresponding substantially with the chemical composition of, one or more silicas present in naturally occurring mineral deposits, except that the amount of volatile material in the product particles may differ from the volatile content of the corresponding naturally occurring mineral,
  have a Color Quest 457 nanometer brightness of at least about 60,
  have an average particle size by volume in the range of up to about 15 microns, and
  include at least about 1% of void volume, based on the volume of the product particles; and
  C. said composition of matter comprises about 15 to 100% by volume of said generally ellipsoidal particles that have said chemical compositions, based on the total volume of solid particles present in said composition of matter.

82. A composition of matter comprising solid particles wherein:
  A. at least a portion of said solid particles are generally ellipsoidal particles that are substantially glassy;
  B. at least a portion of said solid particles respectively constitute product particles produced by at least partial fusion of feed particles while they are flowing in suspension in hot combustion gases, said feed particles containing volatile material ranging in amount from about 1 to about 25% by weight based on the weight of the feed particles,
  are derived from, and have chemical compositions corresponding substantially with the chemical composition of, one or more silicates present in naturally occurring mineral deposits, except that the amount of volatile material in the product particles may differ from the volatile content of the corresponding naturally occurring mineral, have a Color Quest 457 nanometer brightness of at least about 60, have an average particle size by volume in the range of up to about 15 microns, and include at least about 1% of void volume, based on the volume of the product particles; and C. said composition of matter comprises about 15 to 100% by volume of said generally ellipsoidal particles that have said chemical compositions, based on the total volume of solid particles present in said composition of matter.

83. A composition of matter comprising solid particles wherein:

A. at least a portion of said solid particles are generally ellipsoidal particles that are substantially glassy;

B. at least a portion of said solid particles respectively constitute product particles produced by at least partial fusion of feed particles while they are flowing in suspension in hot combustion gases, said feed particles containing volatile material ranging in amount from about 2 to about 25% by weight based on the weight of the feed particles, are derived from, and have chemical compositions corresponding substantially with the chemical composition of, one or more silicas and/or silicates present in naturally occurring mineral deposits, except that the amount of volatile material in the product particles may differ from the volatile content of the corresponding naturally occurring mineral, have a Color Quest 457 nanometer brightness of at least about 60, have an average particle size by volume in the range of up to about 10 microns, and include from about 1% to about 20% of void volume, based on the volume of the product particles; and C. said composition of matter comprises about 50 to 100% by volume of said generally ellipsoidal particles that have said chemical compositions, based on the total volume of solid particles present in said composition of matter.

84. A composition of matter comprising solid particles wherein:

A. at least a portion of said solid particles are generally ellipsoidal particles that are substantially glassy;

B. at least a portion of said solid particles respectively constitute product particles produced by at least partial fusion of feed particles while they are flowing in suspension in hot combustion gases, said feed particles containing volatile material ranging in amount from about 2 to about 25% by weight based on the weight of the feed particles, are derived from, and have chemical compositions corresponding substantially with the chemical composition of, one or more silicas and/or silicates present in naturally occurring mineral deposits, except that the amount of volatile material in the product particles may differ from the volatile content of the corresponding naturally occurring mineral, have a Color Quest 457 nanometer brightness of at least about 60, have an average particle size by volume in the range of up to about 8 microns, and include about 1 to about 15% of void volume, based on the volume of the product particles; and C. said composition of matter comprises about 60 to 100% by volume of said generally ellipsoidal particles that have said chemical compositions, based on the total volume of solid particles present in said composition of matter.

85. A composition of matter comprising solid particles wherein:

A. at least a portion of said solid particles are generally ellipsoidal particles that are substantially glassy;

B. at least a portion of said solid particles respectively constitute product particles produced by at least partial fusion of feed particles while they are flowing in suspension in hot combustion gases, said feed particles containing volatile material ranging in amount from about 2 to about 25% by weight based on the weight of the feed particles, are derived from, and have chemical compositions corresponding substantially with the chemical composition of, one or more silicas and/or silicates present in naturally occurring mineral deposits, except that the amount of volatile material in the product particles may differ from the volatile content of the corresponding naturally occurring mineral, have a Color Quest 457 nanometer brightness of at least about 60, have an average particle size by volume in the range of up to about 6 microns, and include about 1 to about 10% of void volume, based on the volume of the product particles; and C. said composition of matter comprises about 75 to 100% by volume of said generally ellipsoidal particles that have said chemical compositions, based on the total volume of solid particles present in said composition of matter.

* * * * *

UNITED STATES PATENT AND TRADEMARK OFFICE
CERTIFICATE OF CORRECTION

PATENT NO. : 6,254,981 B1
DATED : July 3, 2001
INVENTOR(S) : Richard B. Castle

It is certified that error appears in the above-identified patent and that said Letters Patent is hereby corrected as shown below:

<u>Title page,</u>
Item [56], OTHER PUBLICATIONS, "crystals," should read -- Crystals, --;

<u>Column 1,</u>
Line 6, "was with" should read -- was co-pending with --;

<u>Column 5,</u>
Line 34, after "expansion", the following should be added -- and release of volatile material during heating. --;

<u>Column 7,</u>
Line 46, "[$Al_4S_4O_{16}$])" should read -- [ $Al_4Si_4O_{16}$ ]) --;

<u>Column 9,</u>
Line 4, "$jM_x \cdot mSiO_2 \cdot nH_2O$" should read -- $jM_xO \cdot mSiO_2 \cdot nH_2O$ --;

<u>Column 11,</u>
Line 22, "material s)" should read -- material(s) --;

<u>Column 12,</u>
Line 67, "propylen" should read -- propylene --;

<u>Column 19,</u>
Line 2, "BTU/lbx" should read -- BTU/lb x --;
Line 16, "2000" should read -- 200º --;
Line 17, "3000" should read -- 300º --;

<u>Column 20,</u>
Lines 21 and 22, "in is the product," should read -- in the product, --;

<u>Column 33,</u>
Line 5, "silicates)." should read -- silicate(s) --; and

UNITED STATES PATENT AND TRADEMARK OFFICE
CERTIFICATE OF CORRECTION

PATENT NO.   : 6,254,981 B1
DATED        : July 3, 2001
INVENTOR(S)  : Richard B. Castle It is certified that error appears in the above-identified patent and that said Letters Patent is hereby corrected as shown below:

<u>Column 35,</u>
Line 33, "claim 59." should read -- claim 56. --.

Signed and Sealed this

Twenty-third Day of July, 2002

*Attest:*

*Attesting Officer*

JAMES E. ROGAN
*Director of the United States Patent and Trademark Office*